United States Patent
Friesen et al.

(10) Patent No.: US 10,116,022 B2
(45) Date of Patent: *Oct. 30, 2018

(54) INTERNAL CONVECTION CELL

(71) Applicant: NANTENERGY, INC., Scottsdale, AZ (US)

(72) Inventors: Cody A. Friesen, Fort McDowell, AZ (US); Ramkumar Krishnan, Scottsdale, AZ (US); Grant Friesen, Fountain Hills, AZ (US); Joel Hayes, Chandler, AZ (US)

(73) Assignee: NANTENERGY, INC., Scottsdale, AZ (US)

( * ) Notice: Subject to any disclaimer, the term of this patent is extended or adjusted under 35 U.S.C. 154(b) by 506 days.

This patent is subject to a terminal disclaimer.

(21) Appl. No.: 14/505,234

(22) Filed: Oct. 2, 2014

(65) Prior Publication Data

US 2015/0030941 A1 Jan. 29, 2015

Related U.S. Application Data

(63) Continuation of application No. 13/532,374, filed on Jun. 25, 2012, now Pat. No. 8,906,563.
(Continued)

(51) Int. Cl.
*H01M 12/08* (2006.01)
*H01M 4/86* (2006.01)
*H01M 2/38* (2006.01)

(52) U.S. Cl.
CPC ........... *H01M 12/08* (2013.01); *H01M 2/385* (2013.01); *H01M 4/8605* (2013.01); *Y02E 60/128* (2013.01)

(58) Field of Classification Search
CPC .............................. H01M 2/385; H01M 12/08
See application file for complete search history.

(56) References Cited

U.S. PATENT DOCUMENTS 4,369,235 A 1/1983 Bursell
4,605,626 A 8/1986 Beck
(Continued)

FOREIGN PATENT DOCUMENTS

JP 48-27097 4/1973
JP 56-500790 A 6/1981
(Continued)

OTHER PUBLICATIONS

Australian Office Action dated Nov. 25, 2015 for Appln. No. 2012332825.
(Continued)

*Primary Examiner* — Stephan J Essex
(74) *Attorney, Agent, or Firm* — Pillsbury Winthrop Shaw Pittman, LLP

(57) ABSTRACT

An electrochemical cell includes a permeable fuel electrode configured to support a metal fuel thereon, and an oxidant reduction electrode spaced from the fuel electrode. An ionically conductive medium is provided for conducting ions between the fuel and oxidant reduction electrodes, to support electrochemical reactions at the fuel and oxidant reduction electrodes. A charging electrode is also included, selected from the group consisting of (a) the oxidant reduction electrode, (b) a separate charging electrode spaced from the fuel and oxidant reduction electrodes, and (c) a portion of the permeable fuel electrode. The charging electrode is configured to evolve gaseous oxygen bubbles that generate a flow of the ionically conductive medium. One or more flow diverters are also provided in the electrochemical cell, and configured to direct the flow of the ionically conductive medium at least partially through the permeable fuel electrode.

34 Claims, 13 Drawing Sheets

Related U.S. Application Data

(60) Provisional application No. 61/555,982, filed on Nov. 4, 2011.

(56) References Cited

U.S. PATENT DOCUMENTS

| | | |
|---|---|---|
| 5,011,747 A | 4/1991 | Strong et al. |
| 5,645,952 A | 7/1997 | Lampinen et al. |
| 6,162,333 A | 12/2000 | Lemon et al. |
| 7,794,582 B1 | 9/2010 | Cook et al. |
| 2006/0175720 A1 | 8/2006 | Kerfoot |
| 2010/0261272 A1 | 10/2010 | Chalmers et al. |
| 2011/0070506 A1 | 3/2011 | Friesen et al. |
| 2011/0189551 A1 | 8/2011 | Friesen et al. |

FOREIGN PATENT DOCUMENTS

| | | |
|---|---|---|
| JP | 56-162870 | 12/1981 |
| JP | 01-159973 | 6/1989 |
| JP | 07-090662 A | 4/1995 |
| JP | 09-501256 | 2/1997 |
| JP | 2000-205200 A | 7/2000 |
| JP | 2011-173083 A | 9/2011 |
| JP | 2012-518095 A | 8/2012 |
| JP | 2013-505544 A | 2/2013 |

OTHER PUBLICATIONS

Chinese Office Action dated Dec. 28, 2015 for Appln. No. 2015122301567800.
Chinese Office Action dated Jul. 18, 2016 for Appln. No. 2012102393449.
Canadian Office Action dated Sep. 23, 2016 for Appln. No. 2853245.
Japanese Office Action dated Jan. 10, 2017 for Appln. No. 2014-540009.
European Search Report dated Jul. 16, 2015 for Application No. 12845720.7-1360.
Intl. Search Report/Written Opinion dated Jan. 24, 2013 of PCT/US12/62503 filed Oct. 30, 2012.
Chinese Search Report dated Dec. 6, 2012 of Chinese Appl No. 201220336003.9 filed Jul. 10, 2012.
Intl. Preliminary Report on Patentability dated Nov. 27, 2013 of PCT/US12/62503 filed Oct. 30, 2012.
Japanese Office Action dated Feb. 9, 2016 for Appln. No. 2014-540009.
Office Action Canadian Patent Application No. 2,853,245 dated Jun. 15, 2017.
Office Action issued in corresponding Mexico Application No. MX/a/2014/005136 dated Apr. 17, 2018.
Office Action issued in corresponding Japanese Application No. 2017-093977 dated May 8, 2018 with English translation.

| d | rel-U (m/s) |
|---|---|
| 1 micron | 2.04E-07 |
| 10 microns | 2.00E-05 |
| 100 microns | 1.99E-03 |
| 1 mm | 3.47E-02 |
| 10 mm | 1.20E-01 |
| 100 mm | 3.81E-01 |

Relative velocity between bubbles and ionically conductive medium versus bubble diameter.

FIG. 11

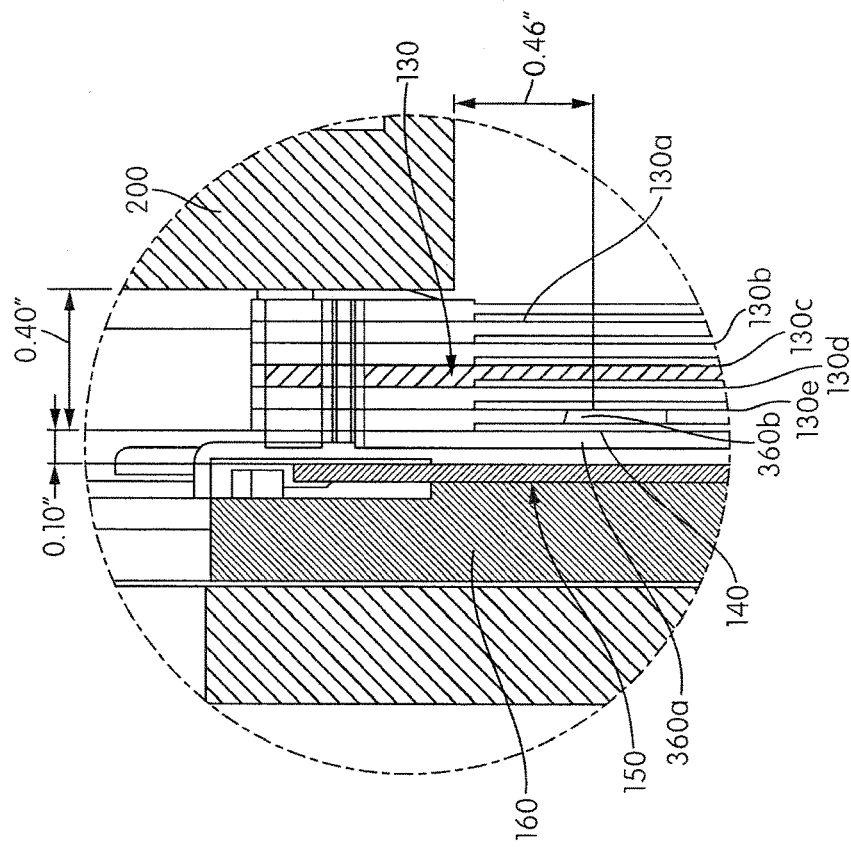
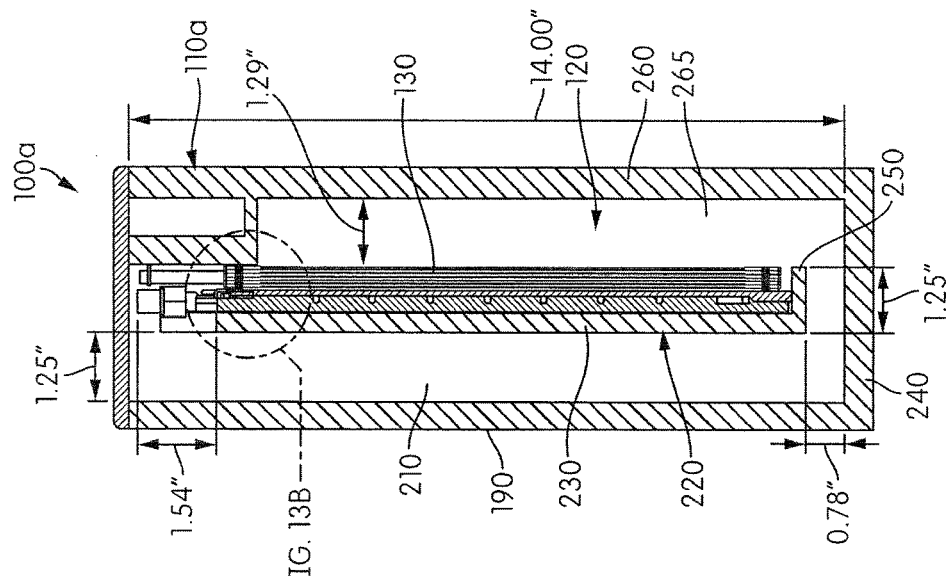
FIG. 13B
FIG. 13A

INTERNAL CONVECTION CELL

CROSS-REFERENCE TO PRIORI APPLICATIONS

This application is a continuation of U.S. Non-provisional patent application Ser. No. 13/532,374 filed Jun. 25, 2012, which claims benefit to U.S. Provisional Patent Application No. 61/555,982, filed Nov. 4, 2011, the entireties of both which are hereby incorporated herein by reference.

FIELD

The present invention is generally related to electrochemical cells, and more particularly to electrochemical cells utilizing a liquid ionically conductive medium.

BACKGROUND

Many types of electrochemical cells utilize a liquid ionically conductive medium to support electrochemical reactions within the cell. For example, a metal-air electrochemical cell system may comprise a plurality of cells, each having a fuel electrode serving as an anode at which metal fuel is oxidized, and an air breathing oxidant reduction electrode at which oxygen from ambient air is reduced. The liquid ionically conductive medium in such cells may communicate the oxidized/reduced ions between the electrodes.

In some electrochemical cell systems utilizing a liquid ionically conductive medium, a flow pump is provided to circulate the ionically conductive medium either within a single cell or among a plurality of cells, so as to permit movement of reducible fuel species in the ionically conductive medium past reduction sites on the fuel electrode, so that the reducible fuel species may be plated as metal fuel on the fuel electrode during charging. Other benefits of the movement of ionically conductive medium are also possible, including but not limited to movement of oxidized species during discharge away from the anode, improving discharge kinetics; the removal of oxygen gas during charging from so-called three-electrode metal-air cells; and the prevention of stratification of the ionically conductive medium. In some electrochemical cell systems, utilizing such flow pumps greatly increases the complexity and size of the system. For example, the use of a flow pump may necessitate or otherwise make desirable fluidly joining multiple cells in a common flow path. Accordingly, in some such cell systems, utilizing a flow pump adds the increased size and expense of not only the flow pump itself, but also may require manifolds, pipes, and a reservoir, so as to connect multiple cells into the flow of the ionically conductive medium. In some cell systems, quick disconnects are provided to facilitate rapid disconnection and reconnection of individual cells or sets of cells from the cell system, such as for repair or replacement, whereby the quick disconnects are utilized to form sufficiently strong seals to prevent loss of ionically conductive medium through the connection points. Additionally, because the sharing of ionically conductive medium between multiple cells may result in a shunt current through the ionically conductive medium, some cell systems, such as those described in U.S. patent application Ser. No. 13/362,775, incorporated herein in its entirety by reference, may include flow dispersing showerheads that physically separate the ionically conductive medium in the flow between the cells, to prevent electrical conductivity through the ionically conductive medium from one cell to another.

One approach to facilitating a flow of ionically conductive medium in a cell is through bubbling of a gas through the cell, so as to create a lifting action by the rising gas in the liquid ionically conductive medium. An example of such an approach is disclosed in U.S. Pat. No. 5,011,747.

For reasons such as, but not limited to, making redundant or obviating the inclusion of the appurtenant features in the electrochemical cell system described above, it may be appreciated that cell systems utilizing a self contained cell configuration may be smaller, lighter, have fewer potential points of failure, and may be less expensive than prior configurations. Among other improvements, the present application endeavors to provide such an effective and improved electrochemical cell that further facilitates establishment of an improved flow of the ionically conductive medium utilizing the lifting action of a rising gas.

SUMMARY

According to an embodiment, an electrochemical cell includes a permeable fuel electrode configured to support a metal fuel thereon, and an oxidant reduction electrode spaced from the fuel electrode. The electrochemical cell also includes an ionically conductive medium for conducting ions between the fuel and oxidant reduction electrodes to support electrochemical reactions at the fuel and oxidant reduction electrodes, and a charging electrode. The charging electrode is selected from the group consisting of (a) the oxidant reduction electrode, (b) a separate charging electrode spaced from the permeable fuel electrode and the oxidant reduction electrode, and (c) a portion of the permeable fuel electrode. The electrochemical cell additionally includes a gas bubble flow generator selected from the group consisting of (a) the charging electrode, and (b) a sparger spaced from the charging electrode. The gas bubble flow generator is configured to evolve gaseous oxygen bubbles that generate a flow of the ionically conductive medium during a charging operation. The electrochemical cell further includes one or more flow diverting surfaces configured to establish a circulation path that directs the flow of the ionically conductive medium at least partially through the permeable fuel electrode.

According to another embodiment, a method is provided for flowing an ionically conductive medium in an electrochemical cell. The electrochemical cell includes a permeable fuel electrode configured to support a metal fuel thereon, an oxidant reduction electrode spaced from the fuel electrode, and a charging electrode selected from the group consisting of (a) the oxidant reduction electrode, (b) a separate charging electrode spaced from the fuel and oxidant reduction electrodes, and (c) a portion of the permeable fuel electrode. The fuel electrode, oxidant reduction electrode, and charging electrode each contact the ionically conductive medium such that the ionically conductive medium may conduct ions therebetween. The method emitting gaseous bubbles in the ionically conductive medium that drag the ionically conductive medium upwards due to their buoyancy to generate a flow. One or more flow diverting surfaces in the electrochemical cell establish a circulation path to direct the flow of the ionically conductive medium at least partially through the permeable fuel electrode.

Other aspects of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 11 depicts a chart illustrating the relative velocity between bubbles of gaseous oxygen and ionically conductive medium verses the diameter of the bubbles, according to some embodiments;

FIGS. 13A-13B depicts a baseline model of an electrochemical cell similar to that depicted in FIG. 3;

DETAILED DESCRIPTION

Figure 1:
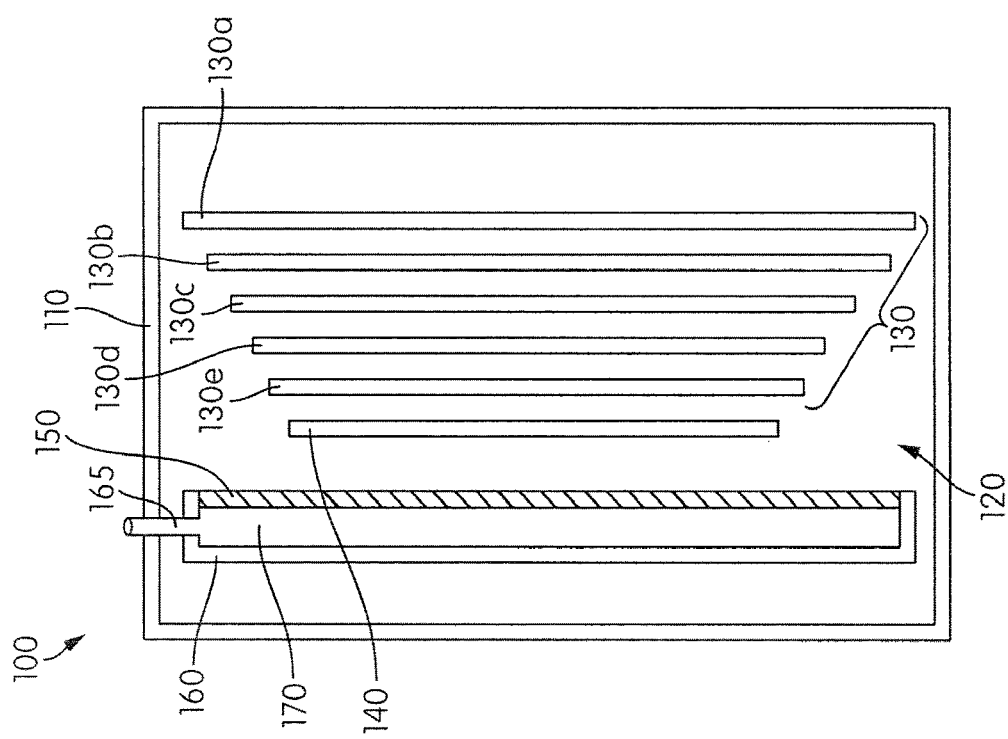
FIG. 1 depicts a schematic view of an electrochemical cell having an immersed oxidant reduction electrode.

FIG. 1 illustrates a schematic cross sectional view of an electrochemical cell 100. As shown, the components of the electrochemical cell 100 may be contained at least partially in an associated housing 110. The cell 100 utilizes a liquid ionically conductive medium that is contained within the housing 110, and is configured to circulate therein to conduct ions within the cell 100. While at times the ionically conductive medium may be generally stationary within the housing 110, such as in a stagnant zone or other quantity of ionically conductive medium, it may be appreciated that the cell 100 may be configured to create a convective flow of the ionically conductive medium. The mechanism for creating the flow of the ionically conductive medium in the cell 100 is a feature of the present disclosure, and is described in greater detail below.

Various portions of the electrochemical cell 100 may be of any suitable structure or composition, including but not limited to being formed from plastic, metal, resin, or combinations thereof. Accordingly the cell 100 may be assembled in any manner, including being formed from a plurality of elements, being integrally molded, or so on. In various embodiments the cell 100 and/or the housing 110 may include elements or arrangements from one or more of U.S. patent application Ser. Nos. 12/385,217, 12/385,489, 12/549,617, 12/631,484, 12/776,962, 12/885,268, 13/028,496, 13/083,929, 13/167,930, 13/185,658, 13/230,549, 13/299,167, 61/515,749, 61/555,952, and 61/556,011, each of which are incorporated herein in their entireties by reference.

While subsequent Figures illustrate the convective flow of the cell 100, FIG. 1 schematically depicts various other components and features of an embodiment thereof. Accordingly, defined within the housing 110 of the cell 100 is a cell chamber 120 that is configured to house the ionically conductive medium, and may define a flow therein. A fuel electrode 130 of the cell 100 may be supported in the cell chamber 120 so as to be contacted by the ionically conductive medium. In an embodiment, the fuel electrode 130 is a metal fuel electrode that functions as an anode when the cell 100 operates in discharge, or electricity generating, mode, as discussed in further detail below. As shown, in some embodiments the fuel electrode 130 may comprise a plurality of permeable electrode bodies 130a-130e. Although in the illustrated embodiment five permeable electrode bodies 130a-130e are used, in other embodiments any number is possible. Each permeable electrode body 130a-130e may include a screen that is made of any formation that is able to capture and retain, through electrodeposition, or otherwise, particles or ions of metal fuel from the ionically conductive medium that flows through or is otherwise present within the cell chamber 120. In an embodiment, electrode body 130a may be a terminal electrode body, configured such that when charging, metal fuel may generally grow on the electrode bodies 130a-e in a direction defined from electrode body 130a towards electrode body 130e. Although in the illustrated embodiment, the permeable electrode bodies 130a-130e may have different sizes so that a stepped scaffold configuration may be used, as described by U.S. patent application Ser. No. 13/167,930, and incorporated by reference above, in other embodiments the permeable electrode bodies 130a-130e may have substantially the same size.

In some embodiments, a plurality of spacers may separate the permeable electrode bodies 130a-130e so as to create flow lanes in the fuel electrode 130. Although in some embodiments the plurality of spacers may be connected to the housing 110 so that the fuel electrode 130 may be held in place relative to the housing 110, in other embodiments the spacers may be molded in between the permeable electrode bodies 130a-130e, and potentially between the fuel electrode 130 and the charging electrode 140, such that the permeable electrode bodies 130a-e (and potentially the charging electrode 140) are part of a combined electrode module. Such a configuration is depicted in U.S. patent application Ser. No. 12/901,410, published as U.S. Patent Application Publication No. 2011/0086278, incorporated by reference in its entirety above. In various embodiments, the spacers may be non-conductive and electrochemically inert so they are inactive with regard to the electrochemical reactions in the cell 100. In some embodiments, the spacers may be made from a suitable plastic material, such as polypropylene, polyethylene, polyester, noryl, ABS, fluoropolymer, epoxy, or so on. The flow lanes in the fuel electrode 130 may be three-dimensional, and have a height that is substantially equal to the height of the spacers. Although generally the spacers would be oriented vertically so as to create flow lanes that are parallel to the charging electrode generating the bubbles, in other embodiments, such as but not limited to where the top of the fuel electrode 130 is blocked, as described below, the spacers may be oriented so as to create flow lanes oriented through the permeable electrode bodies 130*a-e*. It should be appreciated, however, that the spacers and/or flow lanes are optional, and may be omitted in some embodiments.

In some embodiments of the cell 100, such as that illustrated, a charging electrode 140 may be positioned spaced from the fuel electrode 130, distal from the terminal electrode body 130*a* (i.e. proximal to the electrode body 130*e*). In some embodiments, the charging electrode 140 may be a portion of the fuel electrode 130 (including, for example, being one or more of the permeable electrode bodies 130*b*-130*e*). As with the fuel electrode 130, the charging electrode 140 may be positioned within the cell chamber 120, so as to be in contact with the ionically conductive medium. In the illustrated embodiment, the charging electrode 140 is in a stepped configuration similar to the permeable electrode bodies 130*a-e*. In other embodiments, however, the charging electrode 140 may extend at least as far as the longest of the permeable electrode bodies 130*a-e*, when those electrode bodies 130*a-e* are in a stepped scaffold configuration, or otherwise vary in size. As described in greater detail below, the charging electrode 140 may be configured to participate in the oxidation of an oxidizable oxidant species, which is present in the liquid ionically conductive medium, so as to promote the reduction of an oxidized metal fuel species and growth of the metal fuel on the fuel electrode 130 during charging of the cell 100. Accordingly, in some embodiments, the charging electrode 140 may be characterized as an oxygen evolving electrode, due to the bubbling off of oxygen gas from the charging electrode 140 during the charging of the electrochemical cell 100, as described in greater detail below.

Further shown in FIG. 1 is an oxidant reduction electrode 150, which is spaced from the fuel electrode 130 and the charging electrode 140, distal from the terminal electrode body 130*a*. As shown, the oxidant reduction electrode 150 may be sealed or otherwise assembled into an oxidant reduction electrode module 160 that is immersed into the ionically conductive medium in the cell chamber 120. At least one air channel 165 extends into the oxidant reduction electrode module 160, so as to provide air or another other oxidant to an air space 170 that is formed between a housing of the oxidant reduction electrode module 160 and the oxidant reduction electrode 150. It may be appreciated that the air or other oxidant in the air space 170 supplies oxidant to the oxidant reduction electrode 150. Additional details of such a configuration are described in the U.S. Provisional Patent Application 61/555,952, entitled "Immersible Gaseous Oxidant Cathode for Electrochemical Cell System," filed on Nov. 4, 2011, and incorporated by reference in its entirety above. As shown, in embodiments containing the separate charging electrode 140, the separate charging electrode 140 may be positioned between the oxidant reduction electrode 150 and the fuel electrode 130. In embodiments of the cell 100 lacking the separate charging electrode 140, the oxidant reduction electrode 150 may be utilized both during charging and discharging of the cell 100 (i.e. as an anode during charging and as a cathode during discharging).

Components of the cell 100, including for example, the fuel electrode 130, the permeable electrode bodies 130*a-e* thereof, the separate charging electrode 140, and the oxidant reduction electrode 150 may be of any suitable construction or configuration, including, for example, being constructed from one or more of Nickel or Nickel alloys (including Nickel-Cobalt, Nickel-Iron, Nickel-Copper (i.e. Monel), or superalloys), Copper or Copper alloys, brass, bronze, carbon, platinum, silver, silver-palladium, or any other suitable metal or alloy. In some embodiments, one or more components of the cell 100, such as the fuel electrode 130, the separate charging electrode 140, and the oxidant reduction electrode 150, may comprise a highly conductive material that is plated with a more degradation resistant material. For example, in some embodiments the one or more components of the cell may comprise copper that is plated with nickel. As noted above, in some embodiments the fuel electrode 130 may be formed from permeable metal screens (i.e. the permeable electrode bodies 130*a-e*), which may be configured to capture, retain, and provide a growth platform for the metal fuel. Likewise, in some embodiments the separate charging electrode 140 may be of a similar configuration to one of the permeable electrode bodies 130*a-e*. In other embodiments, the charging electrode 140 may be of another configuration, which may be configured to create a potential difference with the fuel electrode 130 so as to encourage fuel growth on the fuel electrode during charging of the electrochemical cell 100. As discussed in greater detail below, the charging electrode 140 may be configured to evolve bubbles of gaseous oxygen during the charging process, which may rise upwards in the cell 100 due to their buoyancy in the ionically conductive medium, which may drive the convective flow of the ionically conductive medium.

Like the fuel electrode 130 and the charging electrode 140, the oxidant reduction electrode 150 may too be of any appropriate construction or configuration. For example, the oxidant reduction electrode 150 may generally be configured to provide for oxygen reduction in the electrochemical cell 100, to create a potential difference with the fuel electrode 130 during discharge of the cell 100. In an embodiment, the oxidant reduction electrode 150 may contain an active layer having meshes or coatings which may be characterized as "active material(s)," that facilitate the electrochemical reactions. Accordingly, in an embodiment, the oxidant reduction electrode 150 is positioned in the cell housing 110 such that the active materials contact the ionically conductive medium such that ions may be conducted therethrough, to and/or from the fuel electrode 130. In some embodiments, the active materials may be formed by a mixture of catalyst particles or materials, conductive matrix and hydrophobic materials, sintered to form a composite material or otherwise layered together. In various embodiments the active materials may be constructed of one or more metals, such as but not limited to those listed above. In some embodiments, the active materials may include a catalyst film, which in various embodiments may be formed by techniques including but not limited to thermal spray, plasma spray, electrodeposition, or any other particle coating method.

Electrically coupled to the active materials may be a current collector, which may be configured to receive electrons from a load for consumption by the oxidant reduction reaction when the cell 100 is in a discharge mode. Likewise, the current collector may be configured to collect electrons from the oxidation reaction at the active materials (i.e. if the oxidant reduction electrode 150 serves as the charging electrode) for delivery to the power supply PS, to participate in the electrochemical reactions at the active materials, when the cell 100 is in a charging mode. The current collector may be of any appropriate construction or configuration, including but not limited to being a metal screen, which may have gaps therein. In various embodiments the current collector may be constructed of metals or alloys such as but not limited to those described above for the active layer.

Additionally included in the oxidant reduction electrode 150 may be one or more hydrophobic materials, which may be any materials that are generally gas permeable but liquid impermeable, so as to contain the ionically conductive medium within the cell housing 110, or otherwise maintain an air space associated with the oxidant reduction electrode 150 (i.e. in the oxidant reduction electrode module 160). Although hydrophobic may in some contexts be understood as "water phobic" it should be appreciated that as used herein, hydrophobic implies that it resists permeation of or repels the ionically conductive medium as a whole, and not necessarily just the water in the ionically conductive medium. As such, the hydrophobic materials may also be considered hydrophobic, or "liquid phobic," materials. The oxidant reduction electrode 150 as a whole may therefore be liquid impermeable, yet permeable to a gaseous oxidant, such that the gaseous oxidant may contact the active materials of the oxidant reduction electrode 150, so as to serve as the oxidant during the electrochemical reactions taking place during discharge of the cell 100. In various embodiments, the hydrophobic materials may be of any suitable construction or configuration that facilitates supporting the active materials thereon, be generally permeable to the gaseous oxidant, and be generally impermeable to the ionically conductive medium.

In some embodiments, the hydrophobic material or materials serve as a backing material for the active materials and/or the current collector. Although the hydrophobic materials may vary across embodiments, in some embodiments the hydrophobic materials may be constructed of or otherwise include a fluoropolymer. As an example, in various embodiments, the hydrophobic materials may comprise polytetrafluoroethylene (also known as PTFE, or Teflon®), which may in some embodiments be thermo-mechanically expanded (also known as ePTFE, or Gore-Tex®). In other embodiments, the hydrophobic materials may comprise Fluorinated Ethylene Propylene (also known as FEP), or any other fluoropolymer. In some embodiments, the hydrophobic materials may have a fine pore size, such as but not limited to one on the order of less than 1 micrometer, or in more particular examples, may be on the order of approximately 50 to 200 nanometers. It may be appreciated that in some embodiments the hydrophobic materials may have limited tensile strength through the thickness of the oxidant reduction electrode 150. Accordingly, in some embodiments the hydrophobic materials may be reinforced by an oxidant-permeable reinforcing layer, such as that disclosed in U.S. Provisional Patent Application 61/556,011, entitled "External PTFE Layer Reinforcement for Oxidant Electrode," filed on Nov. 4, 2011, and incorporated by reference in its entirety above.

The fuel used in the cell 100 may be a metal, such as iron, zinc, aluminum, magnesium, or lithium. By metal, this term is meant to encompass all elements regarded as metals on the periodic table, including but not limited to alkali metals, alkaline earth metals, lanthanides, actinides, and transition metals, either in atomic, molecular (including metal hydrides), or alloy form when collected on the electrode body. However, the present invention is not intended to be limited to any specific fuel, and others may be used. The fuel may be provided to the cell 100 as particles suspended in the ionically conductive medium.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. In an embodiment, the ionically conductive medium may comprise an organic solvent, such as ethylene carbonate, dimethyl carbonate or other appropriate organic solvents, for example. In some embodiments, the ionically conductive medium is aqueous potassium hydroxide. In an embodiment, the ionically conductive medium may comprise an electrolyte. For example, a conventional liquid electrolyte solution may be used, or a room temperature ionic liquid may be used, as mentioned in U.S. patent application Ser. No. 12/776,962, previously incorporated by reference above. In some embodiments, additives may be added to the ionically conductive medium, including but not limited to additives that enhance the electrodeposition process of the metal fuel on the fuel electrode 130, such as is described in U.S. patent application Ser. No. 13/028,496, previously incorporated by reference above. Such additives may reduce the loose dendritic growth of fuel particles, and thus the likelihood of such fuel particles separating from the fuel electrode 130, for example.

In operation of the cell 100, the fuel may be oxidized at the fuel electrode 130 when the fuel electrode 130 is operating as an anode, and an oxidizer, such as gaseous oxygen, gaseous $Cl_2$, or any other appropriate oxidizer, may be reduced at the oxidant reduction electrode 150 when the oxidant reduction electrode 150 is operating as a cathode, which is when the cell 100 is connected to a load and the cell 100 is in discharge or electricity generation mode, as discussed in further detail below. The reactions that occur during discharge mode may generate by-product precipitates, e.g., a reducible fuel species, in the ionically conductive medium. For example, in embodiments where the fuel is zinc, zinc oxide may be generated as a by-product precipitate/reducible fuel species. The oxidized zinc or other metal may also be supported by, oxidized with or solvated in the electrolyte solution, without forming a precipitate (e.g. zincate may be a dissolved reducible fuel species remaining in the fuel). During a recharge mode, which is discussed in further detail below, the reducible fuel species, e.g., zinc oxide or zincate ions, may be reversibly reduced and deposited as the fuel, e.g., zinc, onto at least a portion of the fuel electrode 130 that functions as a cathode. At the same time, either the oxidant reduction electrode 150 or the separate charging electrode 140, and/or another portion of the fuel electrode 130 functions as the anode, and oxidizes an oxidizable oxygen species (e.g., $OH^-$ ions) in the ionically conductive medium to evolve gaseous oxygen. In an embodiment, the oxidizable oxygen species may be the reduced oxidant species that was created in the cell 100 during a discharge thereof.

Although in some embodiments the oxidizer may be delivered to the oxidant reduction electrode 150 by a passive system, which may be sufficient to allow diffusion or permeation of, e.g. oxygen from the air, into the oxidant reduction electrode 150, in other embodiments different sources of the oxidizer or mechanisms for bringing the gaseous oxidizer to the oxidant reduction electrode may be utilized. For example, in an embodiment, a pump such as an air pump AP may be used to deliver the oxidizer to the oxidant reduction electrode 150 under pressure. The air pump AP may be of any suitable construction or configuration, including but not limited to being a fan or other air movement device configured to produce a constant or pulsed flow of air or other oxidant. The oxidizer source may be a contained source of oxidizer. In an embodiment, oxygen may be recycled from the electrochemical cell module 100, such as is disclosed in U.S. patent application Ser. No. 12/549,617, previously incorporated by reference above. Likewise, when the oxidizer is oxygen from ambient air, the oxidizer source may be broadly regarded as the delivery mechanism, whether it is passive or active (e.g., pumps, blowers, etc.), by which the air is permitted to flow to the oxidant reduction electrode 150. Thus, the term "oxidizer source" is intended to encompass both contained oxidizers and/or arrangements for passively or actively delivering oxygen from ambient air to the oxidant reduction electrode 150.

In various embodiments, the permeable electrode bodies 130a-e, the separate charging electrode 140, and the oxidant reduction electrode 150 may be connected by a switching system that may be configured to connect the cell 100 to a power supply PS, a load, or other cells 100 in series. During discharge, the fuel electrode 130 is connected to the load, and operates as an anode so that electrons given off by the metal fuel, as the fuel is oxidized at the fuel electrode 130, flows to the external load. The oxidant reduction electrode 150 functions as the cathode during discharge, and is configured to receive electrons from the external load and reduce an oxidizer that contacts the oxidant reduction electrode 150, specifically oxygen in the air surrounding the cell 100, oxygen being fed into the cell 100, or oxygen recycled from the cell 100.

The operation of the switching system may vary across embodiments, and in some embodiments the operation may be similar to those described in U.S. patent application Ser. No. 13/299,167, incorporated above by reference. As another example, in an embodiment, the external load may be coupled to some of the permeable electrode bodies 130a-130e in parallel, as described in detail in U.S. patent application Ser. No. 12/385,489, incorporated above by reference. In other embodiments, the external load may only be coupled to the terminal permeable electrode body 130a, distal from the oxidant reduction electrode 150, so that fuel consumption may occur in series from between each of the permeable electrode bodies 130a-130e. In some embodiments, the cell 100 may be configured for charge/discharge mode switching, as is described in U.S. patent application Ser. No. 12/885,268, filed on Sep. 17, 2010, previously incorporated by reference above.

In some embodiments, one or more of the electrode bodies 130a-e, the oxidant reduction electrode 150 and/or the charging electrode 140 may be interconnected by the switching system, or any other circuit, so as to selectively facilitate control of the charging and discharging of the cell 100. Switches associated with the switching system may be controlled by a controller, which may be of any suitable construction and configuration, including but not limited to, in some embodiments, conforming generally to those disclosed in U.S. application Ser. Nos. 13/083,929, 13/230,549 and 13/299,167, incorporated by reference above. In various embodiments, the control of the switches of the switching system may be determined based on a user selection, a sensor reading, or by any other input. In some embodiments, the controller may also function to manage connectivity between the load and the power source PS and a plurality of the cells 100. In some embodiments, the controller may include appropriate logic or circuitry for actuating bypass switches associated with each cell 100 in response to detecting a voltage reaching a predetermined threshold (such as drop below a predetermined threshold).

Figure 2:
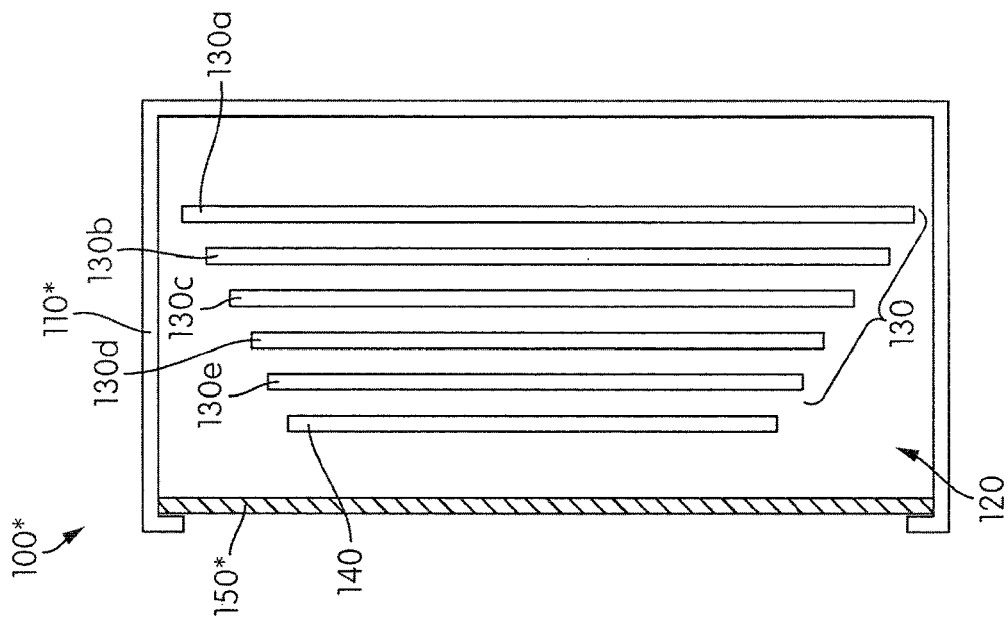
FIG. 2 depicts a schematic view of an electrochemical cell having an oxidant reduction electrode which defines a boundary wall for the electrochemical cell.

Although in the illustrated embodiment of FIG. 1 the cell housing is configured such that the oxidant reduction electrode 150 is immersed with the oxidant reduction electrode module 160 into the cell chamber 120, it may be appreciated that in various embodiments, other configurations or arrangements of the cell 100 are also possible. For example, in FIG. 2, another embodiment of the cell 100 (specifically, cell 100*) is presented, whereby an oxidant reduction electrode 150* defines a boundary wall for the cell chamber 120, and is sealed to a portion of a housing 110* so as to prevent seepage of ionically conductive medium therebetween. Although such a configuration is less preferred, due to concerns that a failure of the oxidant reduction electrode 150* would result in leakage of the ionically conductive medium out of the cell 100*, in some embodiments the convective flow of the ionically conductive medium in the cell chamber 120, described in greater detail below, may be in a direction upwards and away from the oxidant reduction electrode 150*, across the top of the fuel electrode 130.

As noted above, the configuration of embodiments of the cell 100 to facilitate a convective flow of ionically conductive medium therein are subjects of the present application. As indicated above, during operation of the cell 100, oxygen bubbles may form at an oxygen evolving electrode during charging. In the illustrated embodiment the oxygen evolving electrode is the charging electrode 140, but in some embodiments it may be a portion of the fuel electrode 130 and/or the oxidant reduction electrode 150. Thus, any reference herein to an oxygen evolving electrode applies to any of these embodiments, and reference to the charging electrode 140 in the illustrated embodiments may similarly apply to all of these types of oxygen evolving electrodes. It may be appreciated that the buoyancy of the oxygen bubbles that are generated on the surface of the charging electrode 140 during charging may be utilized to circulate the ionically conductive medium of the cell 100. As described in greater detail below, while the bubbles themselves create a lift force, if the bubble sizes are of a small enough size, they may drag a substantial amount of the ionically conductive medium with them to begin flowing the ionically conductive medium in the cell 100. It may be appreciated that the flow of ionically conductive medium may also be assisted by other flow generating mechanisms beyond the bubbles generated at the charging electrode 140, including but not limited to additional gas bubblers, as described in greater detail below.

Figure 3:
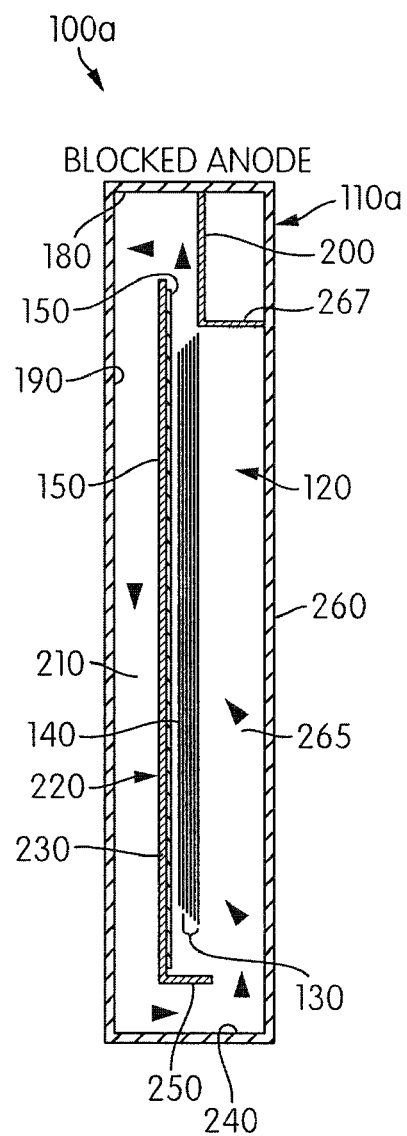
FIG. 3 depicts a schematic view of an electrochemical cell of the configuration of FIG. 1, configured for convective flow of ionically conductive medium therein, according to an embodiment.

In some embodiments the housing 110 may therefore include therein flow diverters providing flow diverting surfaces, including but not limited to blocking walls, baffles, and/or perforated channels, which may be utilized to control the magnitude and the direction of the flow of ionically conductive medium created by the buoyant lifting force of the bubbles, and create convection in the cell 100. In some embodiments, the flow diverters may be integrally molded into the cell housing 110, or may be entirely defined by the shape of the cell housing 110, such as by the internal surfaces of its walls. In other embodiments, the flow diverters may be separate bodies that are installed or otherwise joined into the housing 110. In an embodiment, portions of the fuel electrode 130, charging electrode 140, and/or oxidant reduction electrode 150, or bodies associated therewith, may be shaped or otherwise positioned to serve as a flow diverter and provide one or more flow diverting surfaces. Schematically shown in FIG. 3 is an embodiment of an electrochemical cell 100a configured for generating a convective current (indicated generally by the thick arrows). As shown, the electrochemical cell 100a has the fuel electrode 130, the charging electrode 140, and the oxidant reduction electrode 150. It may be appreciated that in the illustrated embodiment, the oxidant reduction electrode 150 is configured as immersed into the cell chamber 120 of the electrochemical cell 100a, and has associated therewith the oxidant reduction electrode module 160 with the air space 170 (omitted in the illustrated embodiment so as to emphasize the flow of the ionically conductive medium).

Figure 4:
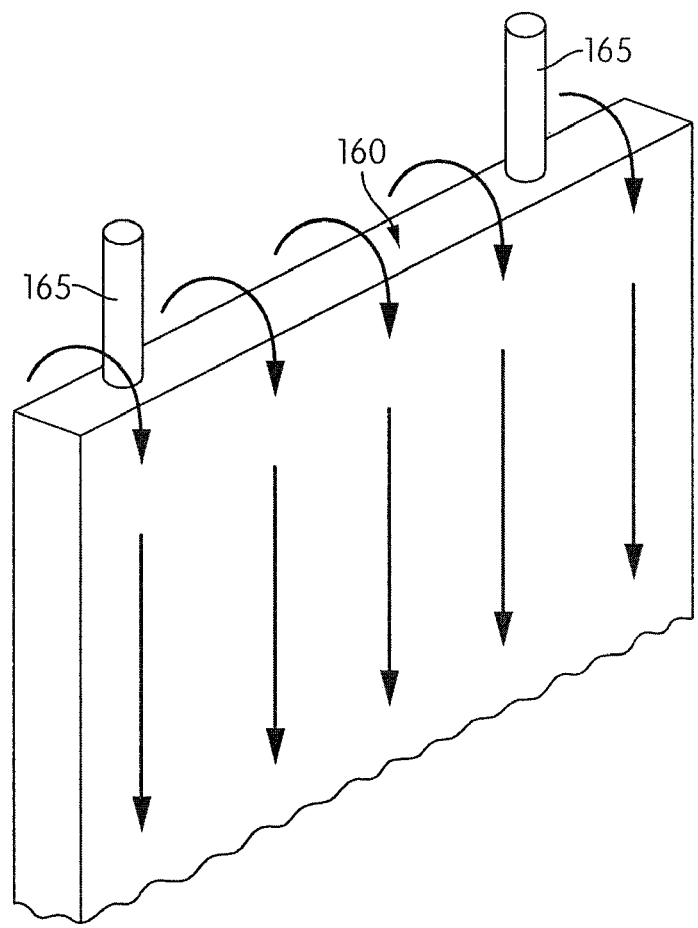
FIG. 4 depicts a perspective view of the immersed oxidant reduction electrode, depicting flow of ionically conductive medium around air channels thereof.

In the illustrated embodiment of FIG. 3, oxygen bubbles generated at the oxygen evolving charging electrode 140 rise upward, due to their buoyancy, to a top 180 of the housing 110a. Although bodies such as the fuel electrode 130, the charging electrode 140, and the oxidant reduction electrode 150 may affect the direction and rate, it may be appreciated that the flow diverters may also guide and direct the flow of ionically conductive medium created by the movement of the bubbles. This movement will generally be constrained around the charging electrode 140, between the fuel electrode 130 and the oxidant reduction electrode 150. In an embodiment, such as that of cell 100a, an area directly vertically above the charging electrode 140 and the fuel electrode 130 may be relatively unblocked to the flow of the oxygen bubbles upwards, towards the top 180. As shown, in some embodiments the movement of the oxygen bubbles may be bounded initially by the fuel electrode 130 and the oxidant reduction electrode 150. As the oxygen bubbles flow past the fuel electrode 130 and the oxidant reduction electrode 150, however, they may subsequently be permitted to flow outwards (i.e., laterally) to a side 190 of the housing 110a, over the immersed oxidant reduction electrode 150 (and the oxidant reduction electrode module 160, not shown in FIG. 3). As may be appreciated from FIG. 4, the air channels 165 that allow the flow of air into the air space 170 are configured to not completely block the ionically conductive medium, so that the flow of ionically conductive medium, and the bubbles initially entrained therein, may generally pass around and/or between the air channels 165, and may flow down the back of the oxidant reduction electrode module 160, as generally illustrated by the depicted arrows (i.e., there is space or spaces therebetween for permitting the flow to travel laterally over the module 160).

In the embodiment of cell 100a, a blocking wall 200 is provided to prevent the bubbles from expanding both towards and away from the side 190. Once the bubbles clear the oxidant reduction electrode 150, the charging electrode 140 and/or the fuel electrode 130, the blocking wall 200 may extend towards the top 180 so that the ionically conductive medium is directed into an off-gassing area 210 of the cell chamber 120. As shown, the off-gassing area 210 may be an area of the cell housing 110a that is bounded by the side 190 and a convection baffle 220, which has an elongated portion 230 that extends in the cell chamber 120 generally parallel to the flow of the bubbles upward from the charging electrode 140, and directs the ionically conductive medium from the top 180 towards a bottom 240 of the cell housing 110a. The off-gassing area 210 may also be referred to as an off-gassing column because of its vertical orientation. In some embodiments, the convection baffle 220 may be formed at least partially from a portion of the oxidant reduction electrode module 160 immersed in the ionically conductive medium. In some embodiments, the off-gassing area 210 may contain therein one or more bubble coalescing structures, such as but not limited to a hydrophobic matting, which may be configured to increase the time that the ionically conductive medium remains in the off-gassing area 210, while the ionically conductive medium flows therethrough. The hydrophobic material may be chosen to be highly porous with a high tortuosity to increase the efficacy of gas separation while not impeding with fluid flow. Other examples of bubble coalescing structures include hydrophobic materials in the shape of felt, membrane or foam.

It may be appreciated that the off-gassing area 210 is generally separated from the electrodes of the cell 100, so that bubbles entrained in the flow of ionically conductive medium may coalesce together and/or separate from the flow of ionically conductive medium therethrough, such that the bubbles in the off-gassing area 210 rise towards the top 180, while the flow of ionically conductive medium continues flowing through the off-gassing area 210. In particular, as the ionically conductive medium is deflected over the off-gassing area 210, away from where more oxygen bubbles are rising from the charging electrode 140, the less buoyant ionically conductive medium is free to separate from the bubbles, and begins to fall towards the bottom 230 of the cell housing 110a. Additionally, as described in greater detail below, bubbles generate less viscous drag with greater volume (i.e. bubble size). Thus, because the bubbles are smaller when they are first generated, they drag more fluid with them than the larger bubbles in the off-gassing area 210, which are formed by the coalescing of the smaller bubbles. This difference in bubble size, and subsequent difference in fluid drag, may be understood as creating the direction of fluid motion that creates the convective flow of the ionically conductive medium. It may therefore be appreciated that in some embodiments the ionically conductive medium may contain therein an additive bubble size limiter which may be configured to minimize a size of the bubbles generated therein. For example, in an embodiment the bubble size limiter may comprise a surfactant, such as but not limited to ionic surfactants classified as anionic type containing sulfate, sulfonate, phosphate or carboxylate anions, or cationic type, containing zwitterions, tertiary amines or quaternary ammonium ions. Surfactants may also be nonionic, containing alcohols, ethers or esters.

It may be appreciated that any particulates or other materials entrained in the flow of ionically conductive medium may also separate from the flow in the off-gassing area 210, and depending on the buoyancy of the particulates, may either settle at the bottom of the off-gassing area 210, or may float at the top of the off-gassing area 210.

As shown, the convection baffle 220 may have a bottom portion 250 with a flow diverting surface that extends laterally and directs the downwardly flowing ionically conductive medium laterally across the bottom 240 to an opposing side of the fuel electrode 130 from the charging electrode 140 which is proximal to permeable electrode body 130a, and is near a side 260 of the cell housing 110a that is distal from the side 190. In some embodiments, this area of the cell chamber 120 may be characterized as a pre-electrode area 265, as illustrated. The convective cycle may therefore be completed by the ionically conductive medium passing through the permeable electrode bodies 130a-e, before being lifted again by the oxygen bubbles rising from the charging electrode 140. Because the oxygen bubble lift raises the liquid ionically conductive medium in the region alongside the charging electrode 140 (or other oxygen evolving electrode), it also creates a negative pressure drop or differential between that region and the pre-electrode area 265, which assists the flow of ionically conductive medium through the fuel electrode 130. The flow through the fuel electrode 130 will thus typically have both an upward and lateral (i.e., horizontal) component, as is illustrated. Similarly, flow in the lateral direction from off-gassing area 210 to pre-electrode area 265 under portion 250 is also encouraged by the positive downward pressure applied from the liquid in the off-gassing area 210, as well as the negative pressure on the pre-electrode area 265 by the bubble-lifted flow Such flow of ionically conductive medium through the permeable electrode bodies 130a-e may have a number of benefits, including but not limited to dislodging bubbles of oxygen or hydrogen that may otherwise adhere to the permeable electrode bodies, which among other things could interfere with fuel growth on the fuel electrode 130 during charging of the cell 100a. Hydrogen evolution (via reduction of $H^+$ to $H_2$) at the fuel electrode 130 is problematic not only because it draws parasitic current that could be used for metal reduction and plating, but its presence of bubbles can occupy space where fuel growth could be taking place, and the bubbles themselves can interfere with the metal growth and reduce its density. Thus, forcibly driving the flow through the body or bodies of the fuel electrode 130 can beneficially reduce these issues. Also, in various embodiments, the circulating flow (i.e. its entire circulation path) may be contained entirely within the housing, so that the flow path is in a closed circuit loop including the bodies of fuel electrode 130, thus avoiding the need to connect the housing 110 to a fluid pump or adjacent cell housings, to permit flow into and out of the housing 110.

As further shown in FIG. 3, in some embodiments a second blocking wall 267 may extend at least partially laterally (i.e., horizontally) between the side 260 and the fuel electrode 130, and may provide a flow diverting surface that prevents the ionically conductive medium from deviating from the convective cycle, by preventing ionically conductive medium from being higher than the fuel electrode 130 in the portion of the convection cycle in the pre-electrode area 265. In other embodiments, other blocking walls or baffles (or other structures providing flow diverting surfaces) may be utilized to direct the flow of the ionically conductive medium through the fuel electrode 130, so as to maintain the convective circuit. Thus, the convective circuit forces the flow to pass up over the oxidant reduction electrode 150, down through the off-gassing area 210, into the pre-electrode area 265, and through the fuel electrode 130

Figure 5:
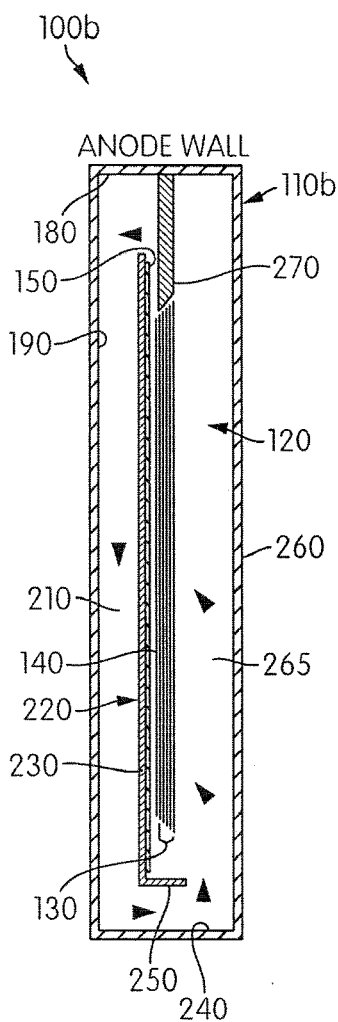
FIG. 5 depicts a schematic view of an electrochemical cell of the configuration of FIG. 1, configured for convective flow of ionically conductive medium therein, according to another embodiment.

Shown in FIG. 5 is another embodiment of the electrochemical cell 100 (specifically, an electrochemical cell 100b). As shown, the electrochemical cell 100b has an associated housing 110b that is configured to form a convective cycle of the ionically conductive medium therein. It may be appreciated that the housing 110b may be generally similar to the housing 110b, such as, for example, containing therein the off-gassing area 210 formed by the elongated portion 230 of the convection baffle 220, and the side 190 of the housing 110b. Additionally the convection baffle 220 again contains the bottom portion 250 that, along with the bottom 240 of the cell housing 110b, provide flow diverting surfaces that guide the flow of ionically conductive medium into the pre-electrode area 265, and from there into a side of the fuel electrode 130 opposite from the charging electrode 140. Unlike the cell 100a, however, cell 100b has an anode wall 270 configured to prevent the convective flow of ionically conductive medium from being lifted with the bubbles from the charging electrode 140 without passing at least partially through each of the permeable electrode bodies 130a-e of the fuel electrode 130. It may be appreciated that in some such embodiments, the bubbles may be constrained to a narrower aperture as they rise from the charging electrode 140 towards the top 180 of the housing 110b, which may affect the convective flow rate of the ionically conductive medium. As shown, in some embodiments, such as that illustrated, where the fuel electrode 130 has a stepped scaffold configuration, the anode wall 270 may be angled or otherwise shaped to match the stepped shape of the fuel electrode 130. Although in some embodiments the ionically conductive medium may be blocked from rising above the height of the fuel electrode 130 on its pre-electrode area 265 side, as was the case in the cell 100a, in some embodiments, such as the embodiment of cell 100b, such a constriction might not be implemented.

This anode wall 270 thus provides a flow diverting surface forcing the ionically conductive medium through the electrode bodies 130a-e. The lower surface of wall 270 may do this directly, and the vertical face of wall 270 may do it indirectly by precluding the flow from circulating over the top of the fuel electrode 130. That is, because the liquid in the space laterally adjacent to wall 270 and above the pre-electrode area 265 is blocked from flowing upward or laterally, this will encourage the flow to circulate through the electrode 130.

Figure 6:
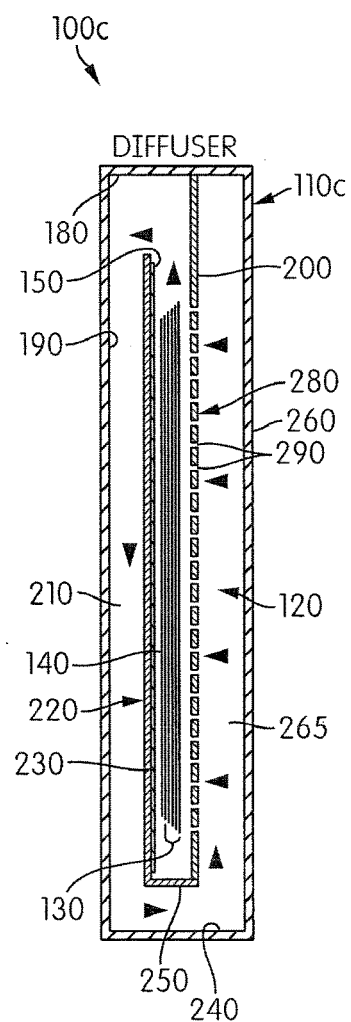
FIG. 6 depicts a schematic view of an electrochemical cell of the configuration of FIG. 1, configured for convective flow of ionically conductive medium therein, according to another embodiment.

FIG. 6 depicts another embodiment of the cell 100 (denoted as a cell 100c). The electrochemical cell 100c has an associated housing 110c with flow diverting surfaces that again forms a convective cycle of the ionically conductive medium therein. As above, the housing 110c may be generally similar to the housing 110a or the housing 110b. For example, the housing 110c contains therein the off-gassing area 210 formed by the elongated portion 230 of the convection baffle 220, and the side 190 of the housing 110c. The convection baffle 220 again contains the bottom portion 250 that, along with the bottom 240 of the cell housing 110c, guides the flow of ionically conductive medium into the pre-electrode area 265, from where it can be drawn at least partially through the fuel electrode 130. In some embodiments, one or more regions of the cell 100, such as the bottom portion 250 and/or the bottom 240 of the cell housing 110, may include or have associated therewith a catch tray electrode configured to oxidize dendritic particles of fuel that have separated from the fuel electrode 130, as described in U.S. patent application Ser. No. 13/185,658, incorporated by reference in its entirety above. As with the cell 100a, a blocking wall 200 generally prevents the bubbles rising from the charging electrode 140 and the ionically conductive medium flowing with them from diverting outwards towards the side 260 of the housing 110c. Instead, the blocking wall 200, potentially in combination with the top wall 180, directs the bubbles, and the flow of ionically conductive medium, laterally towards the side 190 and the off-gassing area 210. Unlike the prior cells 110a and 110b, however the cell 110c includes therein a diffuser 280 that is configured to direct the flow of ionically conductive medium proximal to the side 260 of the cell housing 110c generally perpendicularly into the fuel electrode 130 (i.e. at a right angle to the fuel electrode 130 itself), as opposed to the generally angled flow of the embodiments above. The flow diverting surfaces may be regarded as including the surfaces at the pore or aperture level that direct the flow in this direction. It may be appreciated that the diffuser 280 may vary across embodiments, and as such may have any number of apertures 290 therein that are oriented between the side 260 and the fuel electrode 130. It may also be appreciated that in some embodiments the diffuser 280 may be configured to establish a particular angle or multiple particular angles of flow onto the fuel electrode 130, such as by varying the angle of one or more of the apertures 290. As above, while in some embodiments the ionically conductive medium may be blocked from rising above the height of the fuel electrode 130, in other embodiments, such as the illustrated embodiment of cell 100c, such a constriction might not be implemented.

Figure 7:
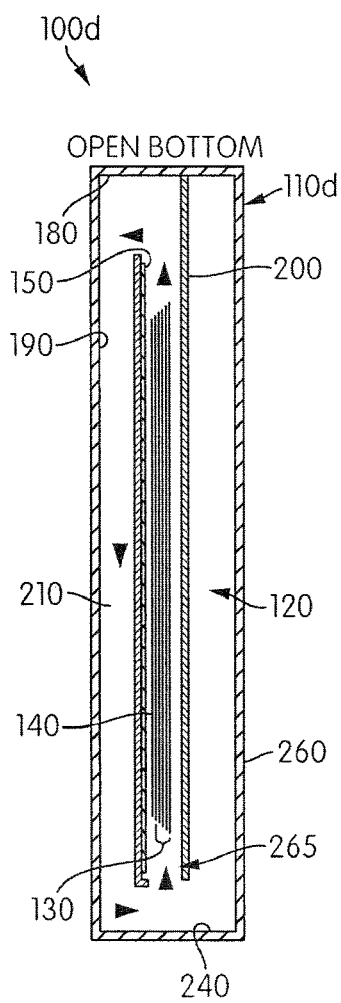
FIG. 7 depicts a schematic view of an electrochemical cell of the configuration of FIG. 1, configured for convective flow of ionically conductive medium therein, according to another embodiment.

FIG. 7 shows another embodiment of the cell 100 (namely, cell 100d), containing an associated housing 110d configured for convective cycling of the ionically conductive medium. As shown, the housing 110d is generally configured such that the convective cycle of the ionically conductive medium passes upwards through the length of the fuel electrode 130. For example, in the illustrated embodiment, the ionically conductive medium is configured to flow vertically generally parallel to and between the permeable electrode bodies 130a-e, instead of being oriented into and through each of the permeable electrode bodies 130a-e as in the previous embodiments. As shown, in an embodiment the blocking wall 200 may generally extend from the top 180 towards the bottom 240, and may be generally parallel to the orientation of the electrodes of the cell 100d. Flow diverting surfaces are thus provided by the surfaces of the oxidant reduction electrode 150 and the wall 200 facing and parallel to the fuel electrode 130. Although in some embodiments the blocking wall 200 may extend as far as the bottom 240, and may replace or otherwise be the side 260, in other embodiments the blocking wall 200 may be spaced from the side 260, such that a supply of ionically conductive medium remains in the space therebetween. As shown in the illustrated embodiment, so that the convective flow of the ionically conductive medium passes along the permeable electrode bodies 130a-e, the convection baffle 220 may lack the bottom portion 250 found in the prior embodiments. In other embodiments, the convection baffle 220 may contain the bottom portion 250, however the bottom portion 250 may contain one or more apertures therein so as to receive the convective flow.

Figure 8:
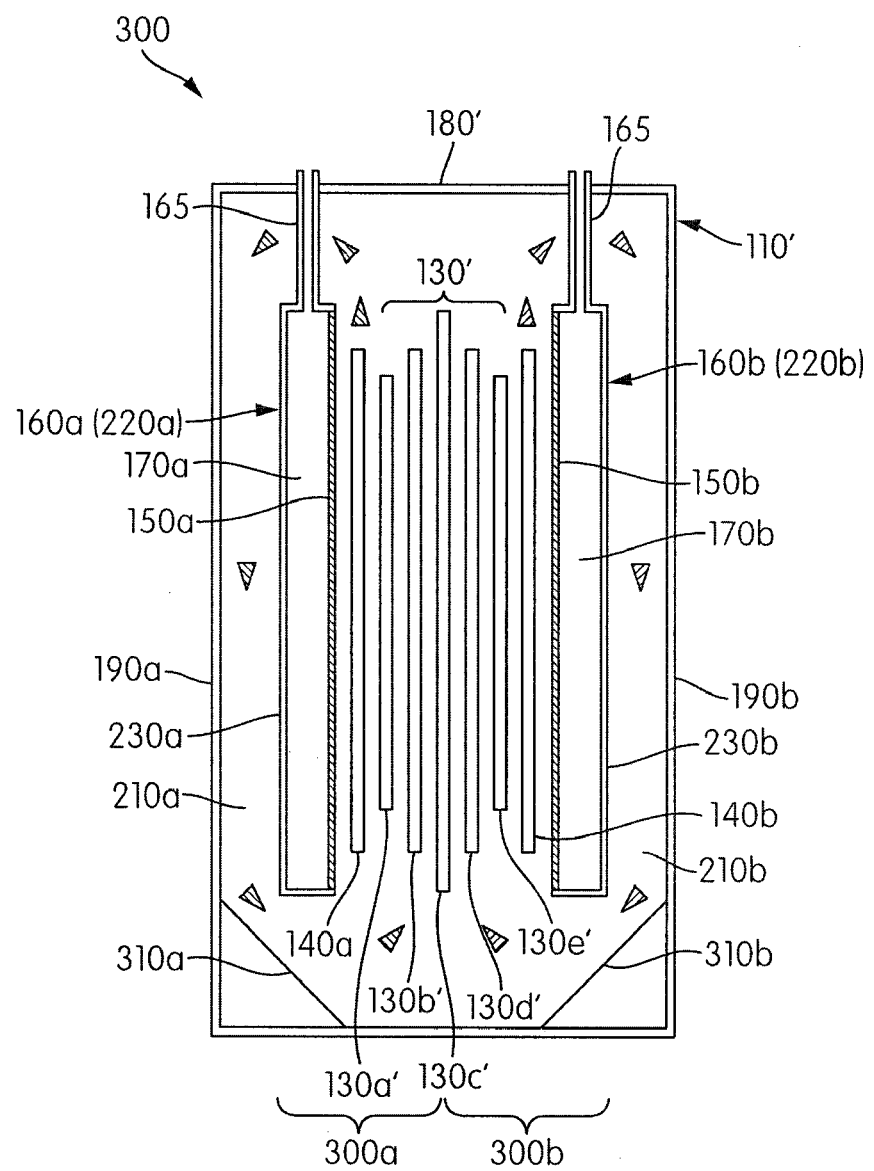
FIG. 8 depicts a schematic view of an bicell having the configuration of FIG. 1, wherein two cells are immersed in a common housing.

As depicted in FIG. 8, it may be appreciated that in some embodiments multiple cells may be installed together in a common housing 110'. Such an assembly may facilitate desired flow directions based on the interaction of bubbles generated from each cell, and may also reduce production costs, by reducing the number of discrete parts therein. The assembly of FIG. 8 contains two cells therein, and thus may be referred to as bicell 300. It may be appreciated that the two cells (individually cell 300a and 300b) define bicell 300, additional cells may also be included in other embodiments (i.e. forming a tricell, a quadcell, or so on). Although in some embodiments each cell 300a and 300b may contain its own associated fuel electrode 130 (i.e. spaced from one another), in other embodiments, such as that shown, bicell 300 contains a common fuel electrode 130' for both cells 300a and 300b. In particular, common fuel electrode 130' is shared by a pair of oxidant reduction electrodes 150a and 150b, associated with cells 300a and 300b respectively. As shown, the illustrated common fuel electrode 130' contains therein a plurality of permeable electrode bodies 130a'-130e' in a stepped scaffold configuration, whereby electrode body 130c' is positioned in the center, and may be associated with either cell 300a or cell 300b. It may be appreciated, then, that permeable electrode bodies 130a' and 130b' may be generally considered to be associated with cell 300a, while permeable electrode bodies 130d' and 130e' may be generally considered to be associated with cell 300b. In some embodiments, however, the entirety of the common fuel electrode 130' may be understood as participating in electrochemical reactions with both oxidant reduction electrode 150a and oxidant reduction electrode 150b. It may be appreciated that the bicell 300 is illustrated schematically in FIG. 8. As such, the illustrated spacing is exaggerated between the oxidant reduction electrodes 150a-b and the common fuel electrode 130', as well as between each of the permeable electrode bodies 130a'-130e'.

Associated with each cell 300a and 300b in the illustrated embodiment are charging electrodes 140a and 140b. Although in the illustrated embodiment charging electrodes 140a and 140b are spaced from the common fuel electrode 130', it may be appreciated that in some embodiments the charging electrodes 140a and 140b may comprise a portion of the common fuel electrode 130', as described above. As shown, the dedicated charging electrodes 140a and 140b may generally be positioned between the common fuel electrode 130' and the oxidant reduction electrodes 150a and 150b. As may be appreciated from the embodiments above, the bubbles formed during charging rise from where they are evolved on the charging electrodes 140a and 140b to the top of the housing 110', and develop a flow of the ionically conductive medium. It may be appreciated that bubbles such as those generated by the charging electrodes 140a and 140b will generally rise upwardly to generate a flow of ionically conductive medium between the oxidant electrodes 150a-b and the common fuel electrodes 130', each of which contains one or more flow diverting surfaces. It may also be appreciated that the surfaces of the charging electrodes 140a and 140b may also be considered flow diverting surfaces, as these surfaces also channel the upward flow of the ionically conductive medium. IN another embodiment, there could be a single charging electrode for the entire electrode 130, such as a charging electrode located in the center, or a portion or portions of the fuel electrode 130 itself.

Unless otherwise constrained by flow diverting surfaces, the bubbles may generally disperse outwardly as they rise upwardly. In the illustrated embodiment of bicell 300, the spaced arrangement of the charging electrodes 140a and 140b, each of which generate their own bubbles, may generally result in the bubbles, and thus the flow, dispersing upwardly and then laterally over the oxidant reduction electrode modules 160a and 160b that are associated with each oxidant reduction electrode 150a and 150b, the surfaces thereof being flow diverting surfaces. Specifically, as the bubbles rise to the top 180' of the housing 110' from each of the charging electrodes 140a and 140b, sufficient bubbles may gather near the top 180' such that there path of least resistance for additional bubbles and flow to travel to is over the top of each of the oxidant reduction electrode modules 160a and 160b, the tops of which also being flow diverting surfaces.

As shown, two separate flow portions may subsequently occur, between the oxidant reduction electrode module 160a and a side 190a of the housing 110' that is proximal to the oxidant reduction electrode module 160a, and between the oxidant reduction electrode module 160b and a side 190b of the housing 110' that is proximal to the oxidant reduction electrode module 160b. Similar to embodiments above, these regions between the oxidant reduction electrode modules 160a-b and the sides 190a-b may be characterized as associated off-gassing regions or columns 210a and 210b, whereby the bubbles may separate from the ionically conductive medium, rising back to the top 180', while the denser ionically conductive medium continues downward within the flow. It may therefore be appreciated that in some cases additional sets of generated bubbles from separate charging electrodes (i.e. charging electrodes 140a and 140b), may be considered flow diverters.

As indicated above, in some embodiments the convection baffle 220 may comprise at least a portion of the oxidant reduction electrode module 160. Such an implementation is depicted in the illustrated embodiment, where convection baffle 220a is formed with oxidant reduction electrode module 160a, while convection baffle 220b is formed with oxidant reduction electrode module 160b. As such, the back walls (distal from the oxidant reduction electrodes 150a and 150b) of the oxidant reduction electrode modules 160a and 160b therefore form the elongated portions 230 (specifically elongated portion 230a and elongated portion 230b). Accordingly, in the illustrated embodiment off-gassing region 210a is formed between side 190a and elongated portion 230a of oxidant reduction electrode module 160a, while off-gassing region 210b is formed between side 190b and elongated portion 230b of oxidant reduction electrode module 160b, the surfaces of the bodies defining the off-gassing regions 210a and 210b each containing flow diverting surfaces. As indicated above, in some embodiments additional flow diverters, containing additional flow diverting surfaces, may also be present. Shown in the illustrated embodiment, for example, are additional flow diverters 310a and 310b, having flow diverting surfaces which are configured to angle the flow of ionically conductive medium at the bottom of the off-gassing regions 210a and 210b, so that the flow from each side is directed generally towards the center of the bicell 300. It may therefore be appreciated that the flow may be generally directed towards the center of the common fuel electrode 130', or to the respective fuel electrodes of each of the cells 300a and 300b of the bicell 300. Thus, while at least one flow diverting surface may be configured to direct the flow of ionically conductive medium through the common fuel electrode 130', in some embodiments multiple flow diverting surfaces may cooperate in doing so.

Although not illustrated in FIG. 8, in some embodiments additional flow diverters or other flow modifying bodies, such as those described in the embodiments above, may be implemented in bicell 300, and have flow diverting surfaces. For example, in some embodiments a bottom portion similar to bottom portion 250 described above may be implemented as associated with each of oxidant reduction electrode modules 160a and 160b. Such a bottom portion may prevent the convective flows from cycling directly around the oxidant reduction electrodes 160a and 160b (i.e. starting with the bubbles generated by the charging electrodes 140a and 140b, around the oxidant reduction electrodes 160a and 160b, and returning back to the charging electrodes 140a and 140b), without at least partially being directed into the common fuel electrode 130'. It may be appreciated that the convective flows will draw ionically conductive medium through the common fuel electrode 130' regardless, by dragging the ionically conductive medium adjacent to the bubble formation at the charging electrodes 140a and 140b, however such bottom portions may in some embodiments increase movement of the ionically conductive medium through the common fuel electrode 130'.

Likewise, in some embodiments a diffuser similar to diffuser 280 may be installed in bicell 300. It may be appreciated that the diffuser may generally be installed underneath common fuel electrode 130', and may align the flows of ionically conductive medium to flow in any desired direction or directions with respect to the common fuel electrode 130'. Additionally, in some embodiments, walls or other flow directing bodies (also called flow diverters), similar to anode wall 270, for example, may be installed generally above common fuel electrode 130', so as to direct the convective flows of ionically conductive medium and the flow of the bubbles generating the flow, after the bubbles rise above the charging electrodes 140a and 140b. It may be appreciated in the embodiment of bicell 300, in the embodiments described above, and in other such embodiments, the various blocking walls and/or other flow diverting bodies may be coupled to the housings (such as housing 110'), the oxidant reduction electrode modules 160a-b, the common fuel electrode 130' (or other fuel electrodes 130), or so on.

Figure 9:
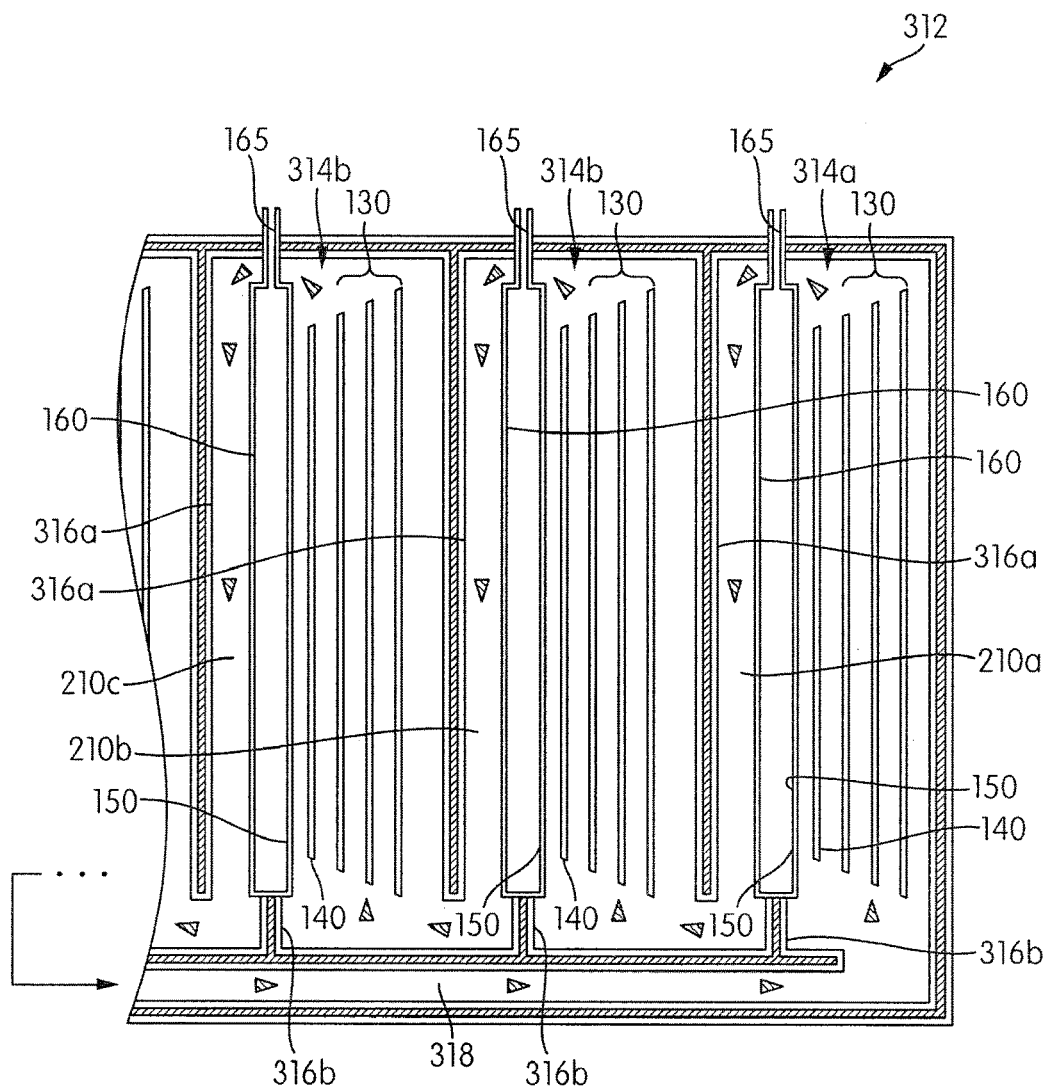
FIG. 9 depicts a schematic view of a series of cells coupled by a common convective flow.

Although in the embodiments of FIGS. 1-8 there is illustrated a single convective flow associated with each cell 100 (or in the case of bicell 300 of FIG. 8, a single convective flow associated with each of cells 300a and 300b thereof), it may be appreciated that in some embodiments a single convective circuit may be utilized through a plurality of cells. For example, FIG. 9 illustrates a cell system 312 comprising a plurality of cells 314 (of which cells 314a-c are visible as illustrated) configured to form a common convective loop. Although three cells are shown in cell system 312, it may be appreciated that cell system 312 need only contain two or more cells to form the convective loop, so fewer or additional cells are possible. As shown, each of the cells 314 includes a permeable fuel electrode 130, a charging electrode 140, and an oxidant electrode 150. As above, each oxidant reduction electrode 150 is coupled to an associated oxidant reduction electrode module 160, and is immersed into the ionically conductive medium, such that oxidant channels 165 provide oxidant to the oxidant reduction electrodes 150 via an airspace 170 associated therewith. Also as above, an off-gassing region 210 is associated with each cell (specifically off-gassing regions 210a-c as illustrated).

Instead of the off-gassing regions 210 being defined between the immersible oxidant electrode 160 and a side wall of the housing for the cell, as in some of the embodiments above, it may be appreciated that the cell system 312 contains interior walls 316, separating the electrodes of each cell, and having flow diverting surfaces facilitating the movement of the convective flow from one cell 314 to another (i.e. from cell 314a to cell 314b to cell 314c, and so on). For example, extending spaced from the oxidant electrode modules 160 are walls 316a that define one side of the off-gassing region 210 for each cell. Additionally, other blocking walls, such as walls 316b, may be positioned under each oxidant electrode module 160, so as to direct the convective flow from a previous cell 314 at least partially through the fuel electrode 130 of that subsequent cell 314. As shown, a return channel 318 may be provided so as to facilitate completion of the convective circuit of ionically conductive medium, such that the ionically conductive medium moved by a last cell 314 in the cycle is recirculated to the first cell 314a, so that it may pass through the fuel electrode 130 thereof. Although the configuration of each cell 314 is depicted similar to that of cell 100d above, it may be appreciated that other blocking walls and flow diverters may have flow diverting surfaces that facilitate directing the flow of ionically conductive medium through the cells 314. Additionally, while the return channel 318 is depicted passing underneath the cells 314, it may take any appropriate path. For example, the cells 314 may be arranged in a two-dimensional array instead of linearly, so as to form a closer fluid circuit. Additionally, in some embodiments separate housings may be provided for the cells 314, and the convective cycle may utilize tubes or other external fluidic connections to complete the convective cycle between the cells.

Figure 10:
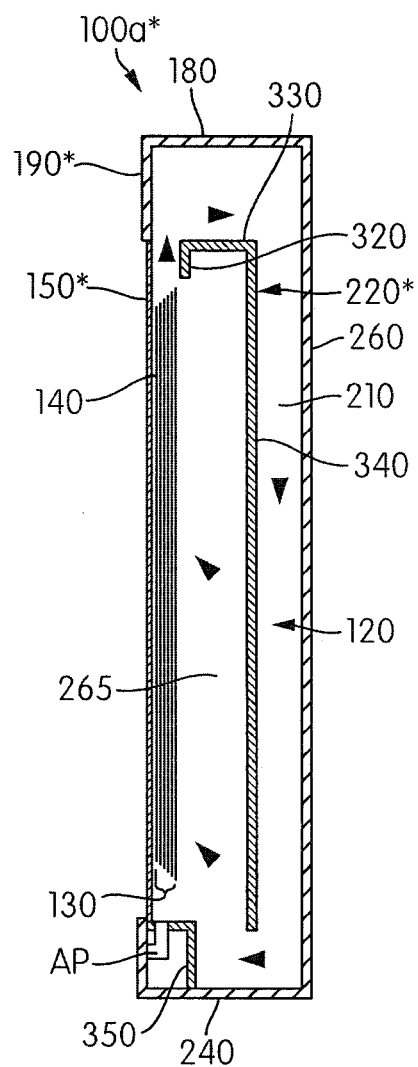
FIG. 10 depicts a schematic view of an electrochemical cell of the configuration of FIG. 2, configured for convective flow of ionically conductive medium therein, according to an embodiment.

It may be appreciated that other configurations of the cell 100 that create a convective flow of the ionically conductive medium constrained to pass through the fuel electrode 130 are also possible. For example, various embodiments of the cell 100*, having the oxidant reduction electrode 150* forming a boundary wall of the housing 110*, may also be configured to generate convective flow. For example, shown in FIG. 10, is a cell 100a* having a housing 110a*. The housing 110a* includes the top 180, the bottom 240, and the side 260, similar to the embodiments of the cells 100a-d described above. As shown, a side 190* is also present, similar to the side 190, however configured to receive therein the oxidant reduction electrode 150*, so that the oxidant reduction electrode 150* may absorb oxygen from the air surrounding the cell 100a*. Furthermore the off-gassing area 210 is additionally present, however relocated from the above variations of the cell 100, as the ionically conductive medium would not flow over the oxidant reduction electrode 150* as it would in the immersed oxidant reduction electrode 150 of the above embodiments.

As shown in the illustrated embodiment, the cell 100a* is configured such that oxygen bubbles evolved at the charging electrode 140 rise upward towards the top 180, whereby the side 190 above the oxidant reduction electrode 150* deflects the oxygenated flow towards the side 260. A convection baffle 220* is shown to further bound the convective flow. For example, in some embodiments, the convection baffle 220* includes a blocking wall 320 that generally extends from near the fuel electrode 130, such that the bubbles are prevented from flowing back towards the fuel electrode 130. A top portion 330 of the convection baffle 220* may be provided to cooperate with the top 180 to redirect the oxygenated ionically conductive medium away from the fuel electrode 130, towards the off-gassing area 210, which in the illustrated embodiment is bounded between the side 260 of the housing 110a*, and an elongated portion 340 of the convection baffle 220*. As in the above embodiments, the ionically conductive medium is permitted to separate away from the bubbles in the off-gassing area 210, falling towards the bottom 240 of the housing 110a*. As further shown, once reaching the bottom 240, the ionically conductive medium may then be directed through the fuel electrode 130, completing the convection cycle. In the illustrated embodiment, a blocking wall 350 is further provided to direct the flow of ionically conductive medium along the bottom 240 upward towards the terminal electrode body 130a, whereby it may pass through the permeable electrode bodies 130a-130e to complete the convection cycle. In other embodiments other blocking walls may be utilized in addition to or alternatively from those of cell 100a*, so as to redirect the flow across each of the permeable electrode bodies 130a-e, similar to the embodiment of the cell 100d. In some embodiments a diffuser may be provided to angle the flow of ionically conductive medium into the fuel electrode 130, similar to the embodiment of the cell 100c. In some embodiments, an anode wall may be utilized to restrict the flow at the fuel electrode 130, and narrow the channel for the oxygen bubbles emitted from the charging electrode 140.

It may be appreciated that in various embodiments the oxygenated ionically conductive medium may have a tendency to rise upward and expand or "bloom" outwardly based solely on the buoyancy of the bubbles and the constrictions placed upon them by the various walls, blocking members, and baffles of cells 100. Accordingly, the top 180 of the various housings 110 may be of any suitable construction or configuration, and may in some embodiments be omitted entirely (i.e. such that the ionically conductive medium is exposed). Such embodiments might not be preferred, however, as fully containing the ionically conductive medium within the cell 100 may prevent spillage of the ionically conductive medium when the cell 100 is moved, or prevent entry of contaminants into the cell 100. In other embodiments, a gas vent may be provided in the cell 100, such as but not limited to that disclosed in U.S. Provisional Patent Application Ser. No. 61/515,749, which may receive the gaseous oxygen near or at the top 180 of the cell chamber 120. In some embodiments, the gas vent may be a gas permeable liquid impermeable membrane, configured to prevent loss of the ionically conductive medium therethrough, but allow the oxygen from the bubbles to escape from the cell. Where the gas vent is liquid impermeable, in some embodiments the gas vent may be located at least partially contacting the ionically conductive medium. In some embodiments, areas above the level of the ionically conductive medium near or at the top 180 may be perforated or otherwise configured such that the gas may exit from the cell 100.

Although generally the charging electrode 140, or other oxygen evolving electrodes in the cell 100, drive the convective cycle by generating gaseous oxygen during charging of the cell 100, it may be appreciated that in some embodiments it may be desirable for the ionically conductive medium to flow within the cell when the cell is in a discharge mode, or when the cell is idle. In some such embodiments, including but not limited to the cell 100a* illustrated in FIG. 10, the cell 100 may contain therein a gas bubbler, including but not limited to an air pump AP, configured to bubble gas through the cell 100. Gas bubblers are also referred to as spargers, which are devices that introduce gas into a liquid. As utilized herein, gas bubblers or spargers can be any device that accomplishes this bubbling of gas in the ionically conductive medium. In some embodiments where the gas bubbler is the air pump AP, the same air pump AP may also be utilized to deliver the oxidant to the oxidant reduction electrode 150 In other embodiments, however, the air pump AP may be separate from that utilized to deliver oxidant to the oxidant reduction electrode 150, if such an air pump is utilized at all. Although the gas introduced by the gas bubbler may be air from surrounding the cell, in various embodiments other gasses or combinations of gasses may be bubbled through the cell, from any appropriate gas source. The bubbles generated by the air pump AP may be of any suitable size or shape so as to move the ionically conductive medium, including in some embodiments being generally similar to the air-bubbles evolved at the charging electrode 140 during charging of the cell. In some embodiments, the air pump AP may be coupled to one or more microtubes, so as to create bubbles of a sufficiently small size to drag the ionically conductive medium. In other embodiments, the air pump AP may be of any other suitable configuration, including but not limited to a centrifugal pump, squirrel-cage pump, axial fan, or stored compressed gas. As shown, in some embodiments the air pump AP may be oriented such that the bubbles generated are permitted to flow through and/or between the oxidant reduction electrode 150, the charging electrode 140, and/or the fuel electrode 130. While in the illustrated embodiment the position of electrodes proximal to the side 190* facilitates installation of the air pump AP thereunder, in other embodiments the air pump AP may be located elsewhere in or associated with the cell 100, while one or more tubes or other channels are provided to channel the air or other gas to an appropriate location on the cell 100, where it may be bubbled into the ionically conductive medium. It may also be appreciated that in some embodiments the air pump AP may be solely responsible for generating the flow of ionically conductive medium through the cell 100 (i.e. through the fuel electrode 130). For example, in some embodiments the oxidant reduction electrode 150 may be bi-functional, so as to be utilized as a charging electrode during charging of the cell 100. In such an embodiment, the oxygen evolved during charging of the cell 100 may be released directly into the air surrounding the cell 100*, or into the air space 170, and thus would not contribute to the convective flow. In such an embodiment, the convective flow in the cell may be generally driven by the bubbles generated by the air pump AP.

The size of the bubbles, either created by the charging electrode 140 (or other oxygen evolving electrode), or by the air pump AP, may affect the rate of the convective flow of the ionically conductive medium. Various configurations of the charging electrode 140 and/or the air pump AP may be utilized to form bubbles of a generally desirable size, so as to achieve a generally desirable convective flow rate. The rate may further be affected by the chemical properties of the ionically conductive medium. It may be appreciated that the momentum transfer between the bubbles and the ionically conductive medium, and thus the relative velocity of the bubbles and the surrounding ionically conductive medium, may be ascertained based on the buoyant force of the bubbles. For example, it is understood that the buoyant force $F_B$ on a sphere such as a bubble generally conforms to the formula:

$$F_B = (\rho_L - \rho_{O_2}) g \frac{4}{3} \pi \left(\frac{d}{2}\right)^3, \quad (1)$$

where $\rho_L$ and $\rho_{O_2}$ are the density of the ionically conductive medium and the gaseous oxygen respectively, g is the gravitational acceleration, and d is the diameter of the sphere. At low speeds, the viscous drag $F_D$ on the bubble may generally be approximated as:

$$F_D = \left[\frac{1}{2} \rho_L \pi \left(\frac{d}{2}\right)^2 \Delta U^2\right] \frac{24}{Re}\left(1 + \frac{3}{8} Re\right), \quad (2)$$

where $\Delta U$ is the relative velocity between the bubble and the fluid, and Re is the Reynolds number, defined as:

$$Re = \frac{\rho_L \Delta U d}{\mu}, \quad (3)$$

with $\mu$ being the viscosity of the ionically conductive medium.

By balancing the buoyant force $F_B$ and the viscous drag $F_D$, a relationship between the diameter of the bubbles and the relative velocity between the bubble and the ionically conductive medium may be ascertained. For example, in an embodiment where the density of the ionically conductive medium $\rho_L$ is approximately 1500 kg/m³, and the viscosity of the ionically conductive medium is approximately $\mu$=0.002 Pa·s, by approximating the gravitational force as g=9.81 m/s², the bubble sizes and the associated relative velocities found in FIG. 11 may be calculated. As shown, with a greater bubble diameter, the buoyant force $F_B$ dominates over the drag force $F_D$, resulting in larger bubbles moving at a larger relative speed through the ionically conductive medium. A larger relative speed means that the bubbles induces less flow of the liquid because the bubbles travel faster than the liquid; and conversely a lower relative speed induces more flow of the liquid because the bubbles and liquid are closer to traveling together. Thus, the inventors of the present application have found that smaller bubble diameters are desirable for inducing lift and flow of the ionically conductive medium within the cell 100.

In some embodiments of the cell 100, the majority of the bubbles generated at the charging electrode 140 (or other oxygen evolving electrodes in the cell 100) may typically be approximately between 1 μm and 50 μm in diameter, while the resulting velocity of the ionically conductive medium may be generally between 0.01 m/s-0.1 m/s. It may therefore be appreciated that such bubble sizes may result in the relative velocity being negligible compared to the velocity of the ionically conductive medium, such that the buoyancy force of the bubbles is transferred to the ionically conductive medium through strong momentum coupling. It should be noted that the relative velocities and associated bubble diameters listed in FIG. 11 are only approximations of various embodiments, and other bubble sizes and relative velocities may be found in various embodiments of the cell 100. For example, in some embodiments, the majority of bubbles generated during charging may be approximately less than 1 mm in diameter. In a more particular example, the majority (i.e. 50% or more) of bubbles, and more preferably 75% or more, generated during charging may be less than 0.1 mm in diameter. In an even more particular example, the majority of bubbles generated during charging, and more preferably 75% or more, may be less than 0.01 mm in diameter. In yet another more particular example, the majority of bubbles generated during charging, and more preferably 75% or more, may be less than 0.01 mm in diameter. In yet a further more particular example, the majority of bubbles, and more preferably 75% or more, generated during charging may be less than 0.001 mm. More preferably, 90% or more of the bubbles is less than these stated maximum sizes. Additionally, it may be appreciated that in some embodiments, smaller bubbles may coalesce into larger bubbles as they rise towards the top 180 of the cell 100, however may still participate in dragging the ionically conductive medium into the flow before and/or after coalescing. As such, the size of the bubbles as described herein may refer to their size at first formation, the average size of the bubbles as they rise to the top 180, and/or the average size of the bubbles once they have reached the top 180. Again, it may be appreciated that bubbles generated by the air pump AP may be similarly sized to the bubbles generated by the charging electrode 140. Furthermore, in various embodiments, a variety of sizes of bubbles may be evolved by the charging electrode 140 and/or the air pump AP during operation of the cell 100.

Figure 12:
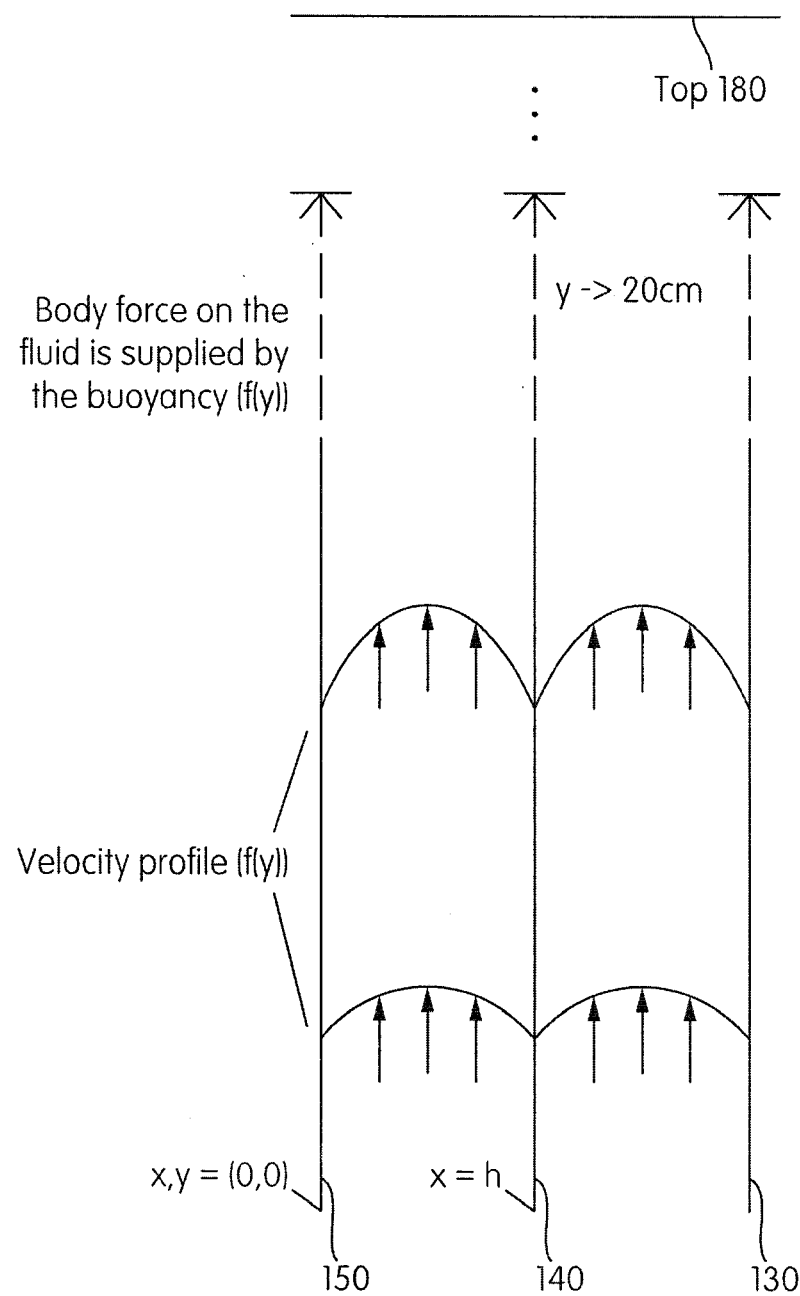
FIG. 12 schematically depicts velocity profiles generated by the emission of bubbles by a charging electrode of an embodiment of the electrochemical cell.

In various embodiments, the lifting force of the bubbles generated at the charging electrode 140 as they rise to the top 180 of the cell 100 may differ depending on a separation h of the oxidant reduction electrode 150 and the fuel electrode 130 from the charging electrode 140. In an embodiment, the separation h may be sufficiently small that the emission of the oxygen bubbles from the charging electrode may generally flow upward towards the top 180, dominating any flow outward from the charging electrode 140. In some such embodiments, the flow upward of the bubbles and the ionically conductive medium may generally resemble Poiseuille flow under the influence of a spatially varying body force supplied by the buoyancy. As shown in FIG. 12, it may be appreciated that oxygen bubbles may be evolved at both sides of the charging electrode 140, and a such, bubble flows may be between the charging electrode 140 and the oxidant reduction electrode 150 one side, and between the charging electrode 140 and the fuel electrode 130 on the other side.

It is understood that the velocity profile of Poiseuille flow generally corresponds to the formula:

$$v_y(y) = \frac{h^2}{2\mu}\left[\left(\frac{x}{h}\right) - \left(\frac{x}{h}\right)^2\right]B_F(y), \quad (4)$$

where $B_F(y)$ is the body force (in N/m³), and h is the channel width (i.e. the separation h between each of the oxidant reduction electrode 150 and the fuel electrode 130 from the charging electrode 140). The total volumetric flow rate of ionically conductive liquid $Q_L$ at location y (in m²/s, due to the 2D calculation of unit-depth) is:

$$Q_L(y) = \frac{h^3}{12\mu}B_F(y). \quad (5)$$

Because the buoyant force on a volume $V_d$ of gaseous oxygen submerged in a liquid corresponds to:

$$F_B = (\rho_L - \rho_{O_2})gV_d, \quad (6)$$

the buoyant force over a given control volume $V_c$ corresponds to:

$$\frac{F_B}{V_C} = (\rho_L - \rho_{O_2})g\frac{V_d}{V_c}. \quad (7)$$

It may be appreciated that $V_d/V_c$ can be represented as the volumetric flow rate of $O_2$ divided by the liquid flow rate passing through a surface of constant y. Additionally, the density of gaseous oxygen is negligible to that of the liquid ionically conductive medium. Accordingly, the body force $B_F(y)$ may be calculated as:

$$B_F(y) = g\rho_L\frac{Q_{O_2}(y)}{Q_L(y)}. \quad (8)$$

By substituting this calculation of the body force $B_F(y)$ into the computation of the volumetric flow in Equation (5), the (squared) volumetric flow of the ionically conductive medium may be solved as corresponding to:

$$Q_L(y)^2 = \frac{h^2}{12\mu}g\rho_L Q_{O_2}(y). \quad (9)$$

In some embodiments of the cell 100, the charging electrode 140 may produce oxygen at a rate of approximately 3.5 cc/min/A. When charging the cell 100 at 20 A, the oxygen production rate may be approximately 1.667 cc/s. In embodiments where the charging electrode 140 is approximately 20 cm×20 cm in size, then approximately 14.58 cc/s/m² of oxygen may be produced on each side of the charging electrode 140, facing either the fuel electrode 130 or the oxidant reduction electrode 150. At steady-state, the amount of oxygen passing through a surface of constant y on a side of the charging electrode 140 is the sum of the oxygen being produced by the oxidant reduction electrode 150 below that surface. Accordingly, the volumetric flow rate of the gaseous oxygen may be calculated (again in units of m²/s to account for the calculation as unit-depth) as:

$$Q_{O_2}(y) = 14.58E^{-6}y. \quad (10)$$

By substituting this flow rate of gaseous oxygen calculation into the squared volumetric flow of the ionically conductive medium found in Equation (9), the flow rate of the ionically conductive medium may be computed as $$Q_L(y) = 1.102E^{-3}\sqrt{\frac{h^3\rho_L gy}{\mu}}. \quad (11)$$

An average channel velocity can thus be calculated by dividing by the channel width h, as:

$$v_y(y) = 1.102E^{-3}\sqrt{\frac{h\rho_L gy}{\mu}}. \quad (12)$$

Additionally, the buoyant lifting force can be calculated utilizing the volume flow rate of the ionically conductive medium calculated at Equation (11) and computation of Equation (5) above, as:

$$B_F(y) = 1.323E^{-2}\sqrt{\frac{\mu\rho_L gy}{h^3}}. \quad (13)$$

It may be appreciated that the calculations provided herein are general representations, and do not account for various effects, such as but not limited to 3D fringe effects, interference of the bubbles with the charging electrode 140 (i.e. where the charging electrode 140 is a metal mesh), asymmetry of bubble formation, flow influence from outside the channel, or so on. In some such cases, the buoyant lifting force $B_F(y)$ for the theoretical embodiment of the cell 100 being charged at 20 A with a 20 cm×20 cm charging electrode 140, may be expressed with a form factor $F_f$ (i.e. a correction factor) as:

$$B_F(y) = F_f \cdot 1.323E^{-2}\sqrt{\frac{\mu\rho_L gy}{h^3}}, \quad (14)$$

whereby the form factor $F_f$ may be calibrated by comparing simulated data with experimental models or production cells. The form factor $F_f$ may also be considered a 'fudge factor' that adjusts for non-idealities in the system. It should be additionally appreciated that while the description above is for an example case, the same principals generally hold at different currents and at different cell sizes as well. It may be appreciated that the spacings between the electrodes (i.e. the value of channel width h) may vary depending on the size of the cell 100. For example, in some embodiments a ratio of electrode height to channel width h may range from approximately between 500:1 to 20:1. In more particular embodiments, the ratio may range from approximately between 200:1 to 40:1.

As indicated above, the construction and configuration of the cell 100 to create the convective flow may vary across embodiments, and may, for example, determine the angle at which the flow is configured to traverse through the fuel electrode 130. It may be appreciated that in some embodiments, the spacing between elements of the cell 100 may further affect the convective flow therein. For example, shown in FIG. 13A and FIG. 13B is a cross sectional view of an embodiment of the cell 100a, depicted in greater detail than the schematic view of FIG. 3. Additionally, size measurements for one non-limiting embodiment of the cell 100a are presented. For example, in the illustrated embodiment of the cell 100a, the width of the off-gassing area 210, defined between the side 190 and the elongated portion 230 of the convection baffle 220, is approximately 1.25". As shown, in some embodiments the ionically conductive medium in the cell 100a might not reach to the top 180 of the cell housing 110a. In some such embodiments, an air-space may exist between the ionically conductive medium and the top 180 (i.e. from which the oxygen bubbles may be vented to the exterior of the cell 100a). In the illustrated embodiment, the distance between the oxidant reduction electrode module 160 and the top of the ionically conductive medium level is approximately 1.54". Once the convective flow of ionically conductive medium reaches the bottom of the cell 240, it may pass through the aperture between the bottom portion 250 of the convection baffle 220 and the bottom 240 of the cell housing 110a, which in the illustrated embodiment is 0.78" in height, and 1.25" in length. After the flow passes beyond the bottom portion 250 of the convection baffle 220, it may rise upward in the pre-electrode area 265, defined between the side 260 and the back of the fuel electrode 130. As shown, the pre-electrode area 265 of the illustrated embodiment of the cell 100a is approximately 1.29" wide. Once in the pre-electrode area 265, the ionically conductive medium is then free to flow through the permeable electrode bodies 130a-e of the fuel electrode 130, completing the convective circuit, and again rising with the bubbles generated at the charging electrode 140.

It may be appreciated that the velocity of the ionically conductive medium being moved by the bubbles may be greatest adjacent to the charging electrode 140. In the illustrated embodiment, this area adjacent to the charging electrode 140 may be defined by channels 360 formed on opposing sides of the charging electrode 140. Specifically, a channel 360a may be characterized as the area between the charging electrode 140 and the oxidant reduction electrode 150, while a channel 360b may be characterized as the area between the charging electrode 140 and the fuel electrode 130. In some embodiments, the velocity of the ionically conductive medium in the channel 360a may be different from the velocity of the channel 360b, such as when the there is a different channel width h associated with each of the channels 360.

As described above, the form factor $F_f$ may be experimentally derived based upon the particularities of the cell housing 110 and the baffles and other walls contained therein. In an embodiment, the velocity of the ionically conductive medium down the off-gassing area 210 in the convection circuit of the cell 100a in FIGS. 13A and 13B may be measured (i.e. through the use of colored dye) as approximately 1.333 mm/s (i.e. a distance of 24 cm in 3 minutes). Based on the calculations above, however, the computed velocity through the same region of cell 100a would be generally 2.210 mm/s. Accordingly, it may be calculated that for the cell 100a of FIGS. 13A and 13B, the observed velocity of 1.333 mm/s may be obtained where the form factor $F_f$ is approximately 0.63. Although the form factor $F_f$ may vary depending on the design of the cell 100, it may be appreciated that in preferred embodiments the cell 100 may be designed such that the form factor $F_f$ is between approximately 0.5 and 0.8. It may be appreciated that if the form factor $F_f$ dampens the flow, a dampening of less than 50% may maintain an efficient momentum transfer.

Figure 14:
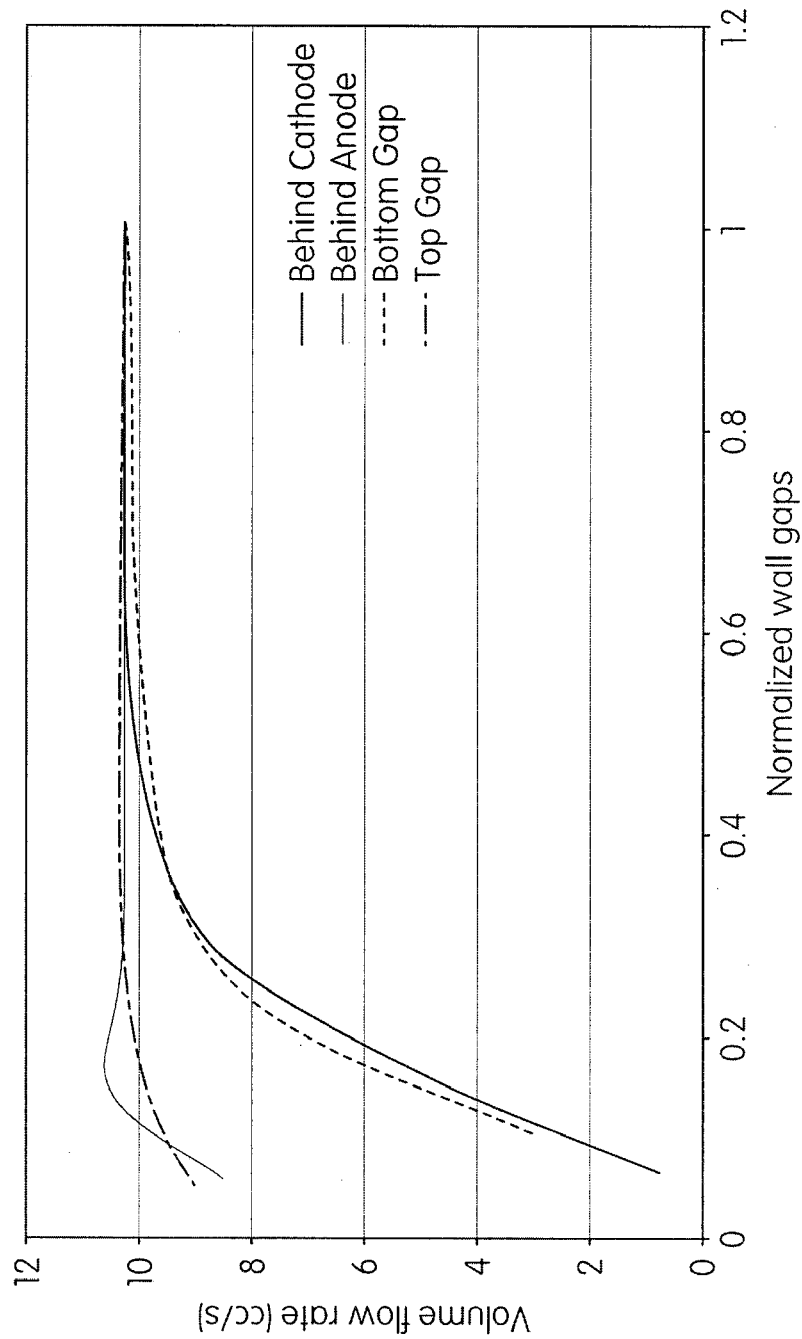
FIG. 14 depicts a chart illustrating how spacing of boundary walls affects the volume flow rate in various locations compared to the baseline model of FIGS. 13A-13B.

In various embodiments design modifications to the cell 100 may facilitate a greater convective flow rate. In some embodiments, it may be preferential to maximize the total convective flow rate while minimizing a variance of flow velocity through the fuel electrode 130. For example, in various embodiments the volume flow rate through the off-gassing area 210 may be affected by the location of the side wall 190. FIG. 14 depicts a chart illustrating how the spacing of the walls defining flow channels for the convective flow may affect the volume flow rate. In particular, the chart of FIG. 14 compares variable wall gaps, normalized to the wall gaps depicted in the embodiment of FIG. 11, with the associated volume flow rates. In the chart, the designation "Behind Cathode" indicates the spacing between side wall 190 and elongated portion 230 of convection baffle 220. The designation "Behind Anode" indicates the spacing between the fuel electrode 130 and the side 260. The "Bottom Gap" designates the spacing between the bottom portion 250 and the bottom 240. Finally, the "Top Gap" denoted in the chart of FIG. 14 represents the distance between either or both of the top of the elongated portion 230 and the oxidant reduction electrode module 160, and the top of the ionically conductive medium in the cell 100a, whereby the top surface of the ionically conductive medium may be treated as a free-slip wall. As shown in the chart, the greatest variance of volume flow rate is found with the modification of the size of the "Behind Cathode" spacing. The volume flow rate for each of the regions, however, begins to plateau at approximately 10 cc/s with a normalized wall gap of approximately 0.5. Accordingly, to maintain both a generally greater yet uniform flow rate, in some embodiments the distance between bodies of the cell 100 may be approximately greater than 2 cm.

Figure 15A:
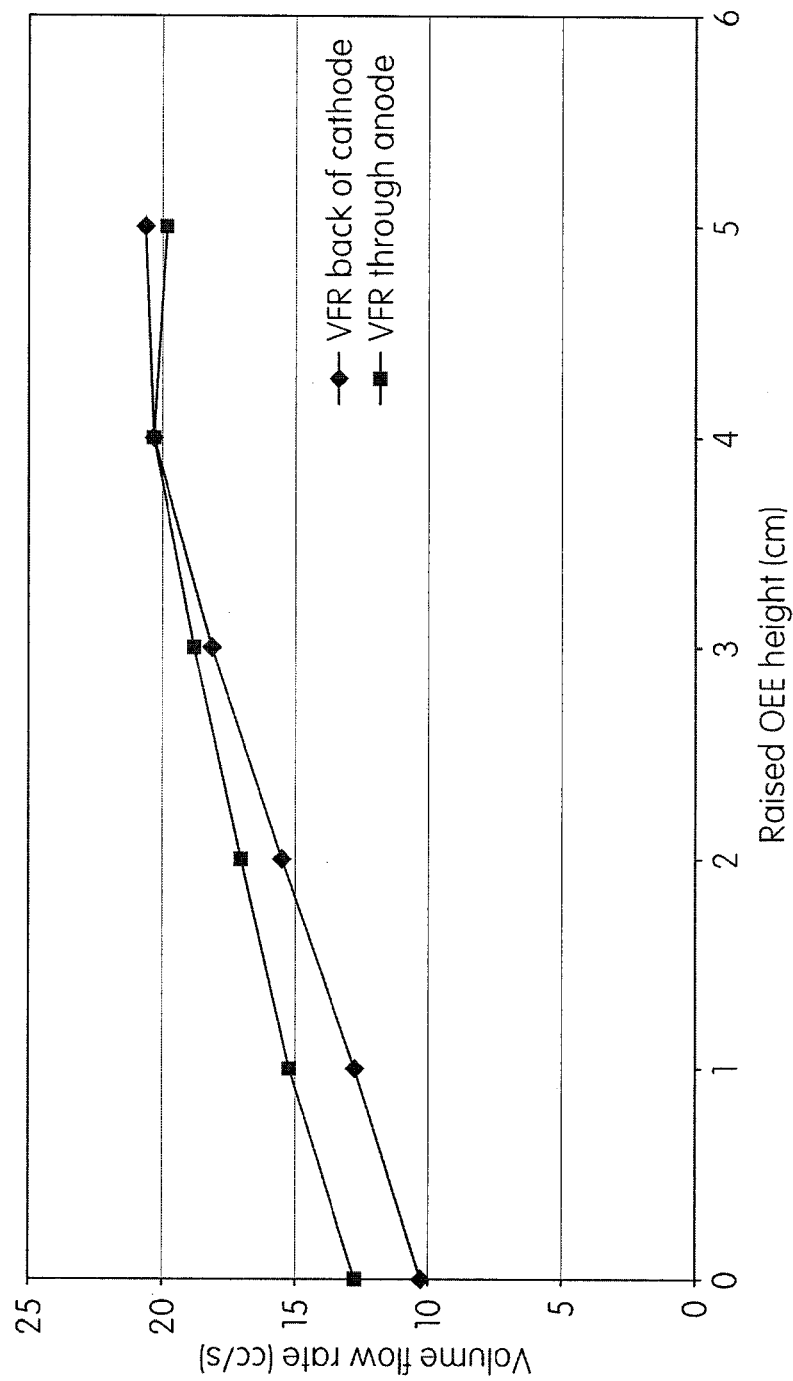
FIGS. 15A-15B depict charts illustrating how raising an oxygen bubble evolving charging electrode relative to a fuel electrode and/or oxidant reduction electrode of the electrochemical cells affects volume flow rate and flow uniformity.
Figure 15B:
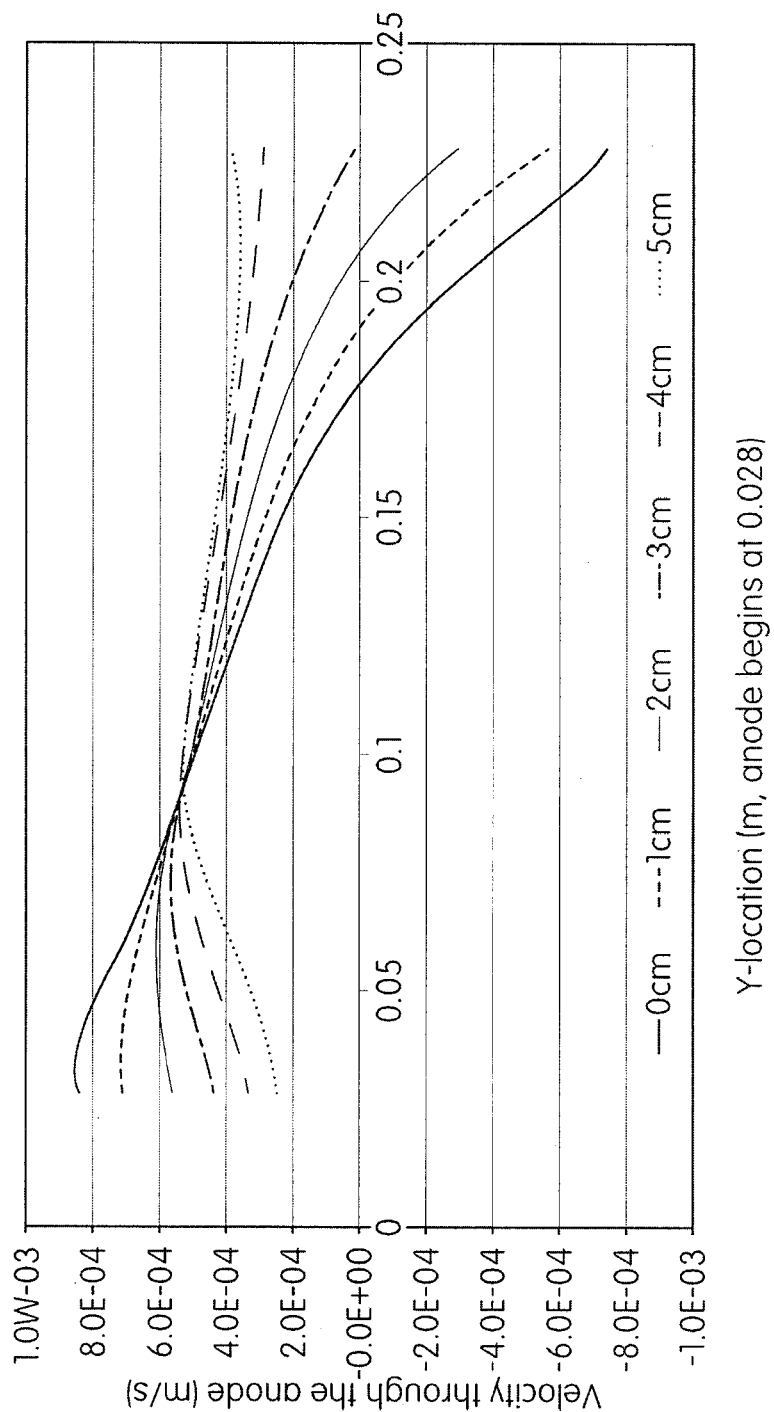

The charts depicted in FIGS. 15A-B illustrate how positioning the OEE (i.e. the charging electrode 140) with respect to the fuel electrode 130 and the oxidant reduction electrode 150 may also affect the volume flow rate within the cell 100. For example, shown in FIG. 15A is the variance of the volume flow rate in both the "Behind Cathode" region and through the fuel electrode 130, based on raising the charging electrode 140 to different heights above a baseline position (i.e. that depicted in the embodiment of cell 100a in FIG. 13A). As shown, the higher the charging electrode 140 with respect to the fuel electrode 130 and the oxidant reduction electrode 150, the greater the volume flow rate. A plateau is shown to develop, however, when the charging electrode 140 is raised higher than approximately 4 cm above its position in the baseline cell 100a depicted in FIG. 13A.

Similarly, FIG. 15B illustrates how the ionically conductive medium flows through different portions of the fuel electrode 130 with different positioning of the charging electrode 140. As shown, for the baseline cell 100a, the flow rate is greatest at the bottom of the fuel electrode 130, however slows at the top of the fuel electrode 130. By raising the charging electrode 140 upwards with respect to the fuel electrode 130, the flow speed at the bottom of the fuel electrode 130 decreases, while the flow speed at the top of the fuel electrode 130 increases. Above a y-location on the fuel electrode 130 of approximately 0.08 m, a benefit to raising the charging electrode 140 relative to the fuel electrode 130 may be appreciated, as recirculation at the top of the fuel electrode 130 increases the flow rate through those areas. As is also seen in FIG. 15B, raising the charging electrode 140 relative to the fuel electrode 130 may normalize the disparity of the flow rate between the top and the bottom of the fuel electrode 130. Accordingly, a general amount of uniformity of the flow rate throughout the entire height of the fuel electrode 130 (i.e. across all y-locations of the fuel electrode 130) may be achieved when the charging electrode 140 is raised approximately 4 cm above the baseline position depicted in FIG. 13A, relative to the fuel electrode 130.

It may be appreciated that the offsetting of the charging electrode 140 from the fuel electrode 130 may vary across embodiments, and the examples shown in the charts of FIGS. 15A and 15B are merely exemplary based on the embodiment of the cell 100a depicted in FIG. 13A. Likewise, it may be appreciated that the offsetting amount, if any, may also affect the electric field of the cell 100, which may affect fuel growth and consumption during the charging and discharging of the cell 100. Accordingly, in some embodiments, an offsetting of the charging electrode 140 above the fuel electrode 130 may be positioned to account for both flow rate and electric field considerations.

It may be appreciated that other modifications to the cell 100 may affect the flow rate of the convection cycle (i.e. as compared to the baseline embodiment depicted in FIG. 13A). For example, in an embodiment, removing the bottom portion 250 (i.e. similar to the embodiment of the cell 100d in FIG. 6) may reduce both the volume flow rate through the fuel electrode 130, and the uniformity of the flow through the fuel electrode 130, by approximately half. In an embodiment, adding a wall to block the top of the channels of the fuel electrode 130 (such as the anode wall 270) in combination with a wall to prevent the ionically conductive medium from rising above the fuel electrode 130 in the pre-electrode region 265 (i.e. the second blocking wall 267), may slightly reduce the volume flow rate in the off-gassing area 210 by reducing or preventing recirculation of the ionically conductive medium in the pre-electrode region 265. In another embodiment, it may be appreciated that utilizing the diffuser 280 as shown in the embodiment of FIG. 6 may slightly increase the volume flow rate in the off-gassing area 210 and through the fuel electrode 130, while only slightly reducing the variance of the flow velocities through different portions of the fuel electrode 130. In yet another embodiment, blocking the top of the fuel electrode 130 (i.e. with the anode wall 270) while removing the wall that prevents recirculation (such as the second blocking wall 267), such as is depicted in the embodiment of cell 100b in FIG. 5, may generally reduce the volume flow rate in the off-gassing area 210 and through the fuel electrode 130, and the fluid velocity variance, by approximately half. In yet a further embodiment, blocking the top of the fuel electrode 130 (i.e. with the anode wall 270), blocking the ionically conductive medium to direct the flow (i.e. with the blocking wall 200), but not blocking the bottom of the fuel electrode 130 (i.e. by omitting the bottom portion 250), may generally double the volume flow rate through the off-gassing area 210, and increase by approximately half the volume flow rate through the fuel electrode 130, but may reduce the variance of flow through the screens of the fuel electrode 130 by more than approximately an order of magnitude.

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. Thus, the present invention is intended to encompass all modifications, substitutions, alterations, and equivalents within the spirit and scope of the following appended claims.

What is claimed is:

1. An electrochemical cell comprising:
   a housing comprising:
   a permeable fuel electrode configured to support a metal fuel thereon;
   an oxidant reduction electrode spaced from the fuel electrode;
   a liquid ionically conductive medium for conducting ions between the fuel and oxidant reduction electrodes to support electrochemical reactions at the fuel and oxidant reduction electrodes;
   a charging electrode selected from the group consisting of (a) the oxidant reduction electrode, (b) a separate charging electrode spaced from the permeable fuel electrode and the oxidant reduction electrode, and (c) a portion of the permeable fuel electrode;
   a gas bubble flow generator selected from the group consisting of (a) the charging electrode, and (b) a sparger spaced from the charging electrode, the gas bubble flow generator being configured to evolve gaseous oxygen bubbles that generate a flow of the ionically conductive medium during a charging operation; and
   one or more flow diverting surfaces,
   wherein when the electrochemical cell is positioned such that the oxidant reduction electrode is in a vertical orientation, the one or more flow diverting surfaces establishes a closed circuit circulation path within the housing that directs the flow of the ionically conductive medium at least partially through the permeable fuel electrode,
   wherein the fuel electrode and the oxidant reduction electrode are configured to, during discharge, oxidize the metal fuel at the fuel electrode and reduce an oxidant at the oxidant reduction electrode to generate a discharge potential difference therebetween for application to a load and generate a by-product of oxidized metal precipitated or solvated in the ionically conductive medium, and
   wherein the fuel electrode and the charging electrode are configured to, during re-charge, reduce a reducible species of the metal fuel to electrodeposit the metal fuel on the fuel electrode and oxidize an oxidizable species of the oxidant by application of a re-charge potential difference therebetween from a power source.

2. The electrochemical cell system of claim 1, wherein the closed circuit circulation path is established by the one or more flow diverting surfaces to divert the flow of the ionically conductive medium upwardly from the permeable fuel electrode and laterally over a top of the oxidant reduction electrode to a side thereof opposite the fuel electrode.

3. The electrochemical cell of claim 2, further comprising an off-gassing area configured to permit the gaseous oxygen bubbles to separate from the ionically conductive medium in the flow of ionically conductive medium.

4. The electrochemical cell of claim 3, wherein the off-gassing area comprises a column on the side of the oxidant reduction electrode opposite the fuel electrode.

5. The electrochemical cell of claim 2, wherein the oxidant reduction electrode is immersed in the ionically conductive medium with an air space associated therewith to provide a gaseous oxidant thereto, and wherein the one or more flow diverting surfaces are configured to divert the flow of the ionically conductive medium upwardly from the permeable fuel electrode and laterally over the top of the oxidant reduction electrode and the air space, to a side thereof opposite the fuel electrode.

6. The electrochemical cell of claim 5, further comprising an off-gassing area configured to permit the gaseous oxygen bubbles to separate from the ionically conductive medium in the flow of ionically conductive medium;
   wherein the off-gassing area comprises a column on the side of the oxidant reduction electrode opposite the fuel electrode, wherein the oxidant reduction electrode is assembled into an oxidant reduction electrode module configured to maintain the air space therein, and wherein the oxidant reduction electrode module bounds at least a portion of the off-gassing area on the side thereof opposite the fuel electrode.

7. The electrochemical cell of claim 3, wherein the one or more flow diverting surfaces comprises a flow diverting surface configured to direct the flow of ionically conductive medium from the off-gassing area to a region of the fuel electrode distal from the oxidant reduction electrode and the charging electrode.

8. The electrochemical cell of claim 7, wherein the one or more flow diverting surfaces comprises a diffuser for directing the flow of ionically conductive medium generally perpendicularly into a face of the fuel electrode.

9. The electrochemical cell system of claim 3, wherein the off-gassing area comprises one or more bubble coalescing structures.

10. The electrochemical cell system of claim 9, wherein the one or more bubble coalescing structures comprise hydrophobic matting.

11. The electrochemical cell system of claim 1, wherein the fuel electrode comprises a series of permeable electrode bodies arranged in spaced apart relation.

12. The electrochemical cell of claim 11, wherein the one or more flow diverting surfaces comprises a flow diverting surface configured to prevent at least a portion of the flow from passing through less than all of the series of permeable electrode bodies of the fuel electrode.

13. The electrochemical cell of claim 12, wherein the one or more flow diverting surfaces comprises a flow diverting surface configured to prevent at least a portion of the flow from passing through less than all of the series of permeable electrode bodies comprises a wall extending across a top of the fuel electrode.

14. The electrochemical cell of claim 11, wherein the one or more flow diverting surfaces comprises a flow diverting surface configured to direct the flow of the ionically conductive medium at least partially through the permeable fuel electrode are configured to direct the flow generally parallel and between the series of permeable electrode bodies.

15. The electrochemical cell of claim 1, wherein the gas bubble flow generator is only the charging electrode.

16. The electrochemical cell of claim 1, wherein the sparger comprises an air pump configured to emit bubbles of gas into the ionically conductive medium.

17. The electrochemical cell of claim 16, wherein the sparger further comprises one or more microtubes configured to generate the bubbles of the gas in the electrochemical cell.

18. The electrochemical cell of claim 1, wherein at least some of the bubbles emitted by the sparger are approximately less than 1 mm in diameter.

19. The electrochemical cell of claim 18, wherein a majority of the bubbles generated by the sparger are approximately less than 100 μm in diameter.

20. The electrochemical cell of claim 19, wherein the majority of bubbles generated by the sparger are approximately between 1 μm and 100 μm in diameter.

21. The electrochemical cell of claim 1, wherein the ionically conductive medium comprises an aqueous electrolyte solution.

22. The electrochemical cell of claim 21, wherein the aqueous electrolyte solution comprises sulfuric acid, phosphoric acid, triflic acid, nitric acid, potassium hydroxide, sodium hydroxide, sodium chloride, potassium nitrate, lithium chloride, an organic solvent, or an ionic liquid.

23. The electrochemical cell of claim 1, further comprising a bubble size limiter in the ionically conductive medium, configured to minimize a size of the bubbles generated by the bubble generator.

24. The electrochemical cell of claim 23, wherein the bubble size limiter comprises a surfactant.

25. The electrochemical cell of claim 2, further comprising a second oxidant reduction electrode spaced from and opposing the oxidant reduction electrode, with the permeable fuel electrode being positioned between the oxidant reduction electrode and the second oxidant reduction electrode.

26. The electrochemical cell of claim 25, wherein the permeable fuel electrode is a common fuel electrode associated with both the oxidant reduction electrode and the second oxidant reduction electrode, such that during discharge, the metal fuel on the common fuel electrode is oxidized while an oxidant at each of the oxidant reduction electrode and the second oxidant reduction electrode is reduced.

27. The electrochemical cell of claim 25, wherein the permeable fuel electrode comprises a first permeable fuel electrode associated with the first oxidant reduction electrode, and a second permeable fuel electrode associated with the second oxidant reduction electrode.

28. The electrochemical cell of claim 25, wherein when the electrochemical cell is positioned such that the first and second oxidant reduction electrodes are in the vertical orientation, the one or more flow diverting surfaces establishes a pair of closed circuit circulation paths that direct the flows of the ionically conductive medium upwardly and laterally over the tops of both the oxidant reduction electrode and the second oxidant reduction electrode and to the sides thereof opposite the fuel electrode.

29. The electrochemical cell of claim 28, wherein the one or more flow diverting surfaces establishes the pair of circulation paths as closed circuits within the cell.

30. The electrochemical cell of claim 1, wherein the circulation path is established within the cell.

31. The electrochemical cell of claim 25, wherein each oxidant reduction electrode is immersed in the ionically conductive medium with an air space associated therewith to provide a gaseous oxidant thereto.

32. The electrochemical cell of claim 31, wherein each oxidant reduction electrode is assembled into a respective oxidant reduction electrode module configured to maintain the air space therein, with the permeable fuel electrode being positioned between the oxidant reduction electrode and the second oxidant reduction electrode.

33. The electrochemical cell of claim 32, wherein the permeable fuel electrode is a common fuel electrode associated with both the oxidant reduction electrode and the second oxidant reduction electrode, such that during discharge, the metal fuel on the common fuel electrode is oxidized while an oxidant at each of the oxidant reduction electrode and the second oxidant reduction electrode is reduced.

34. The electrochemical cell system of claim 1, wherein the reducible species of the metal fuel that is reduced during re-charge is the oxidized metal in the ionically conductive medium.

* * * * *